Dec. 21, 1937.     J. W. COOMBS     2,102,995
ARTICLE FILING AND DELIVERY SYSTEM
Filed Oct. 22, 1935     20 Sheets-Sheet 8

Inventor
J. W. Coombs
By
Robb & Robb
Attorneys

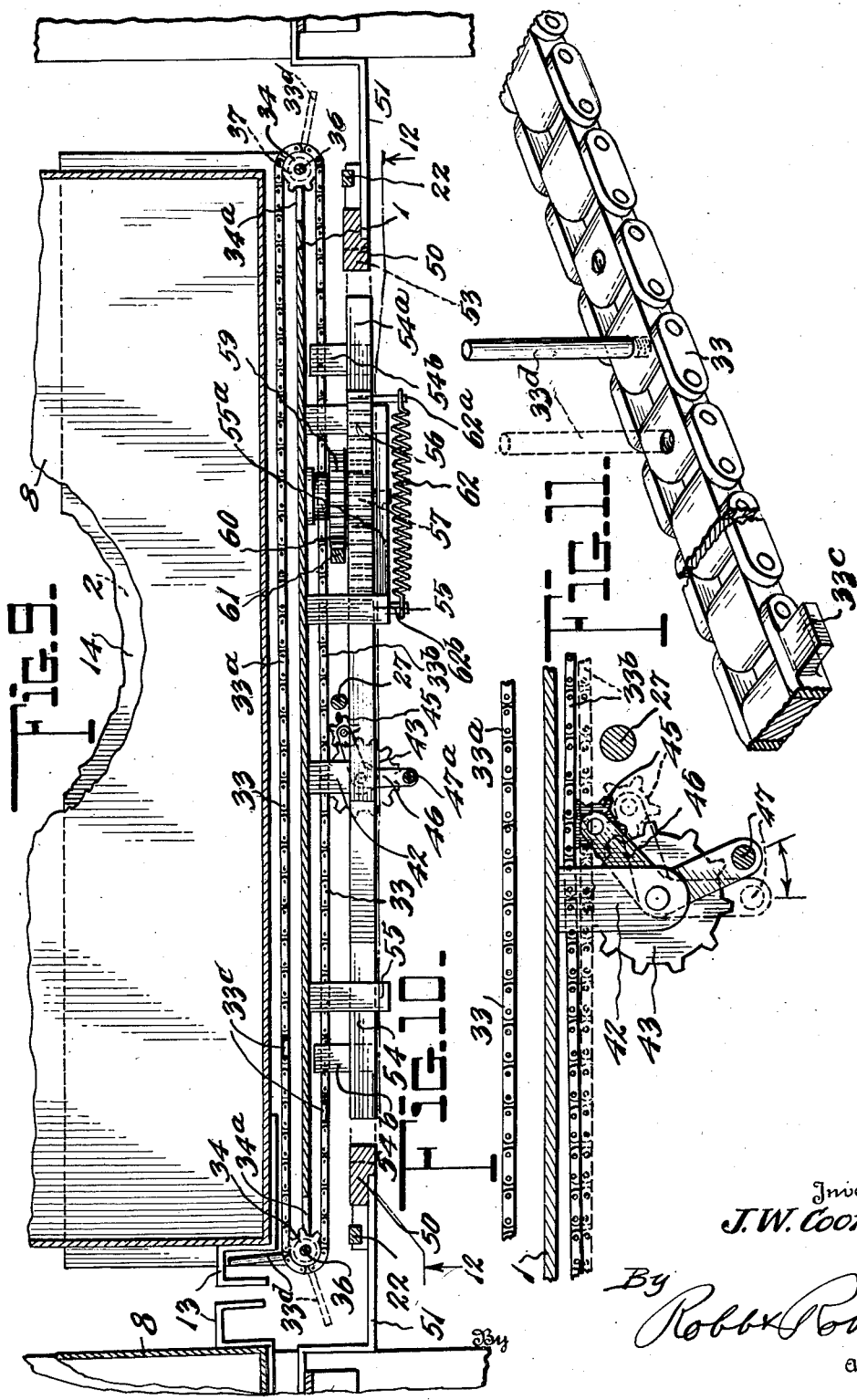

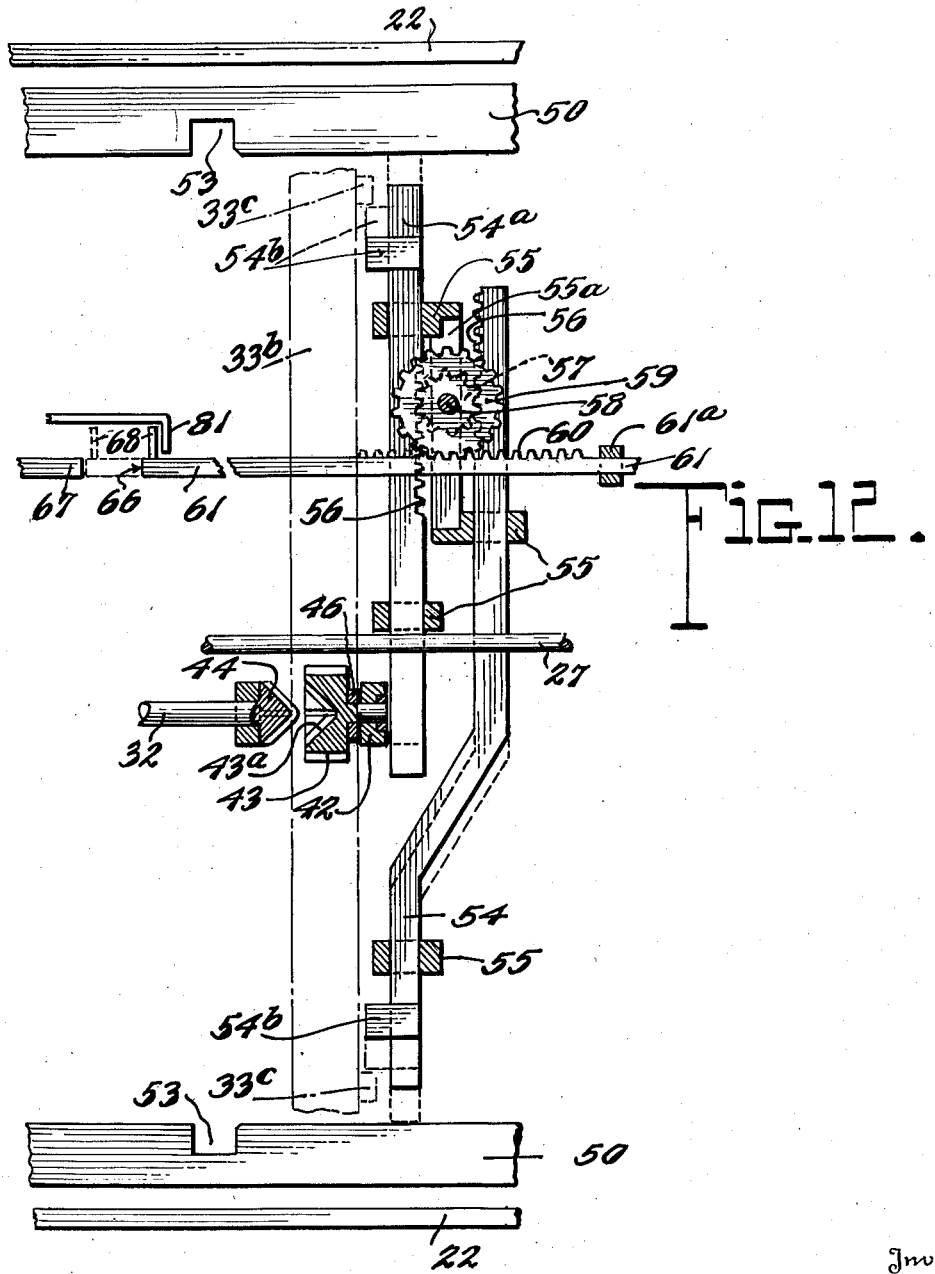

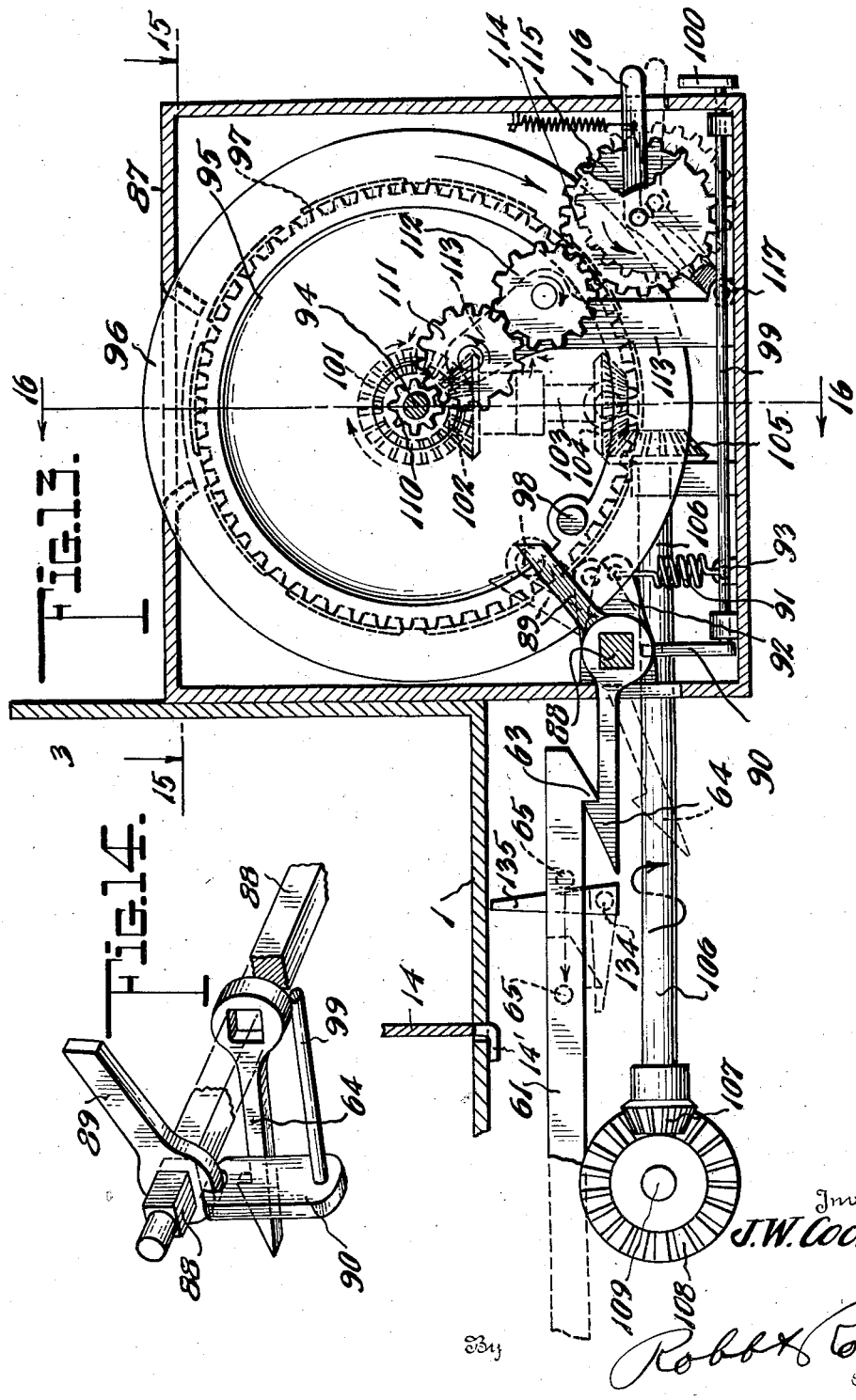

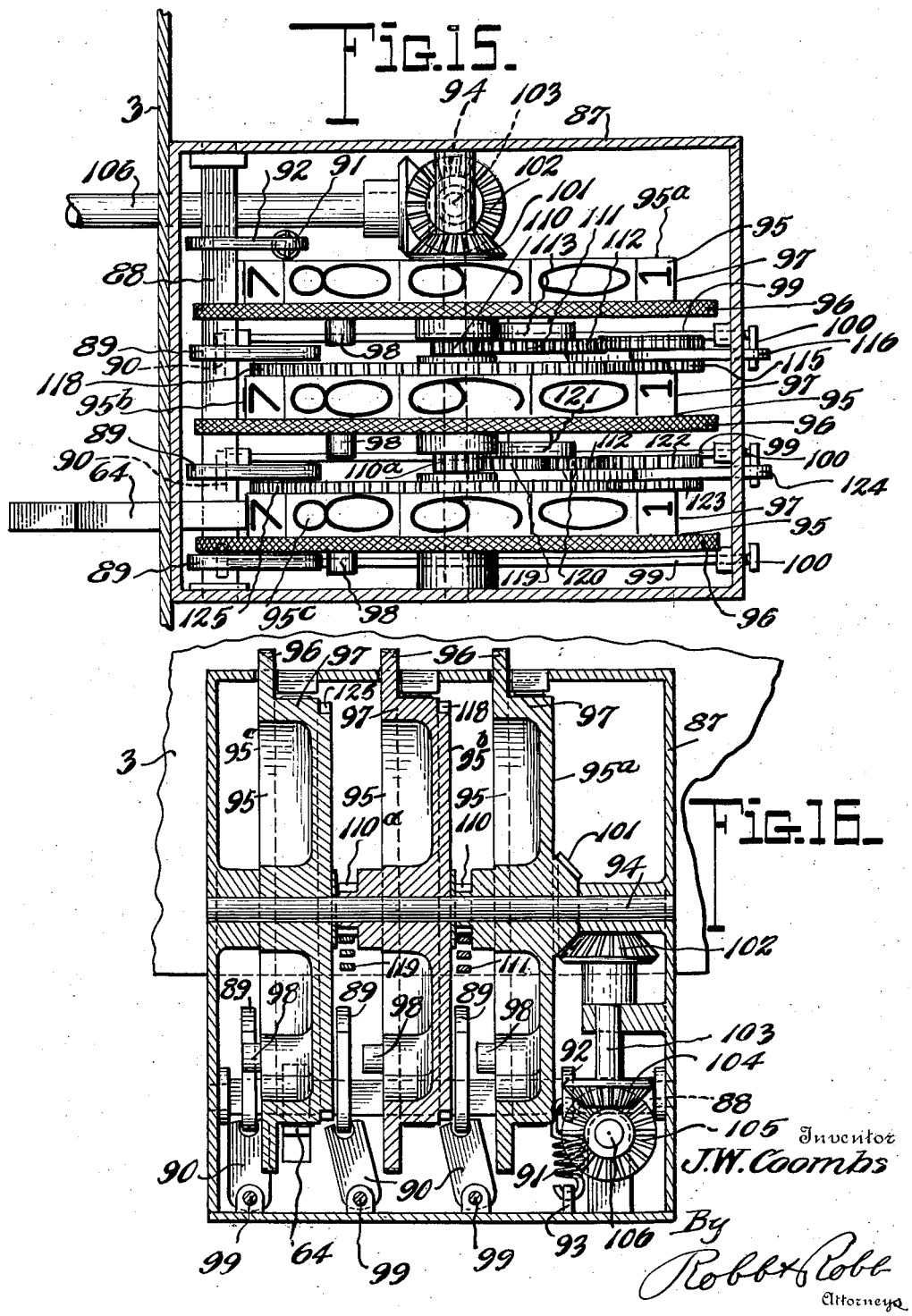

Dec. 21, 1937.  J. W. COOMBS  2,102,995
ARTICLE FILING AND DELIVERY SYSTEM
Filed Oct. 22, 1935  20 Sheets—Sheet 13
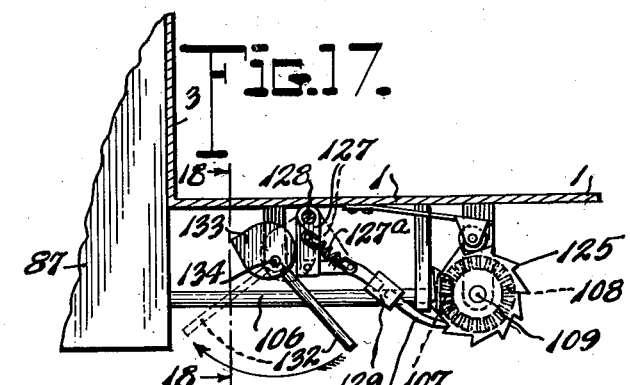
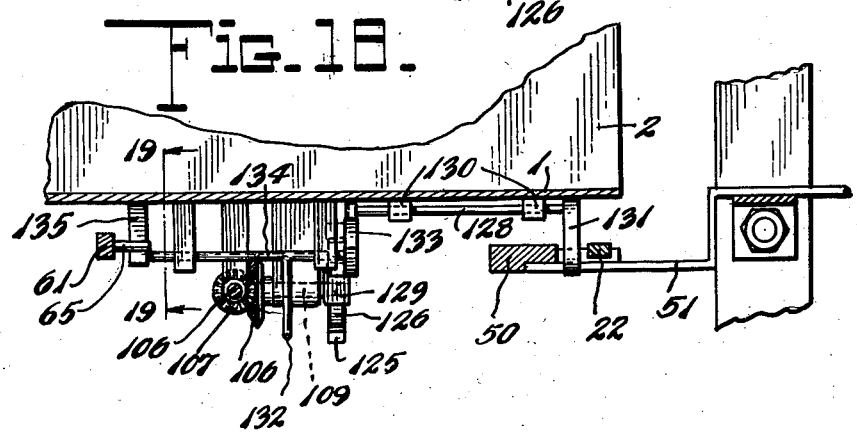
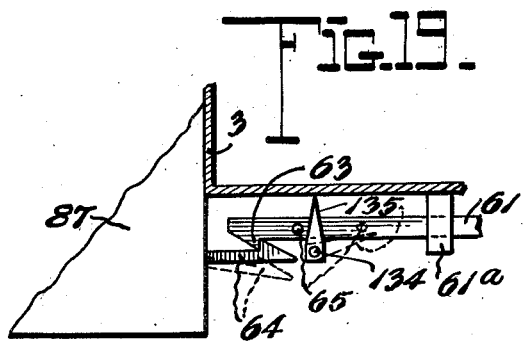

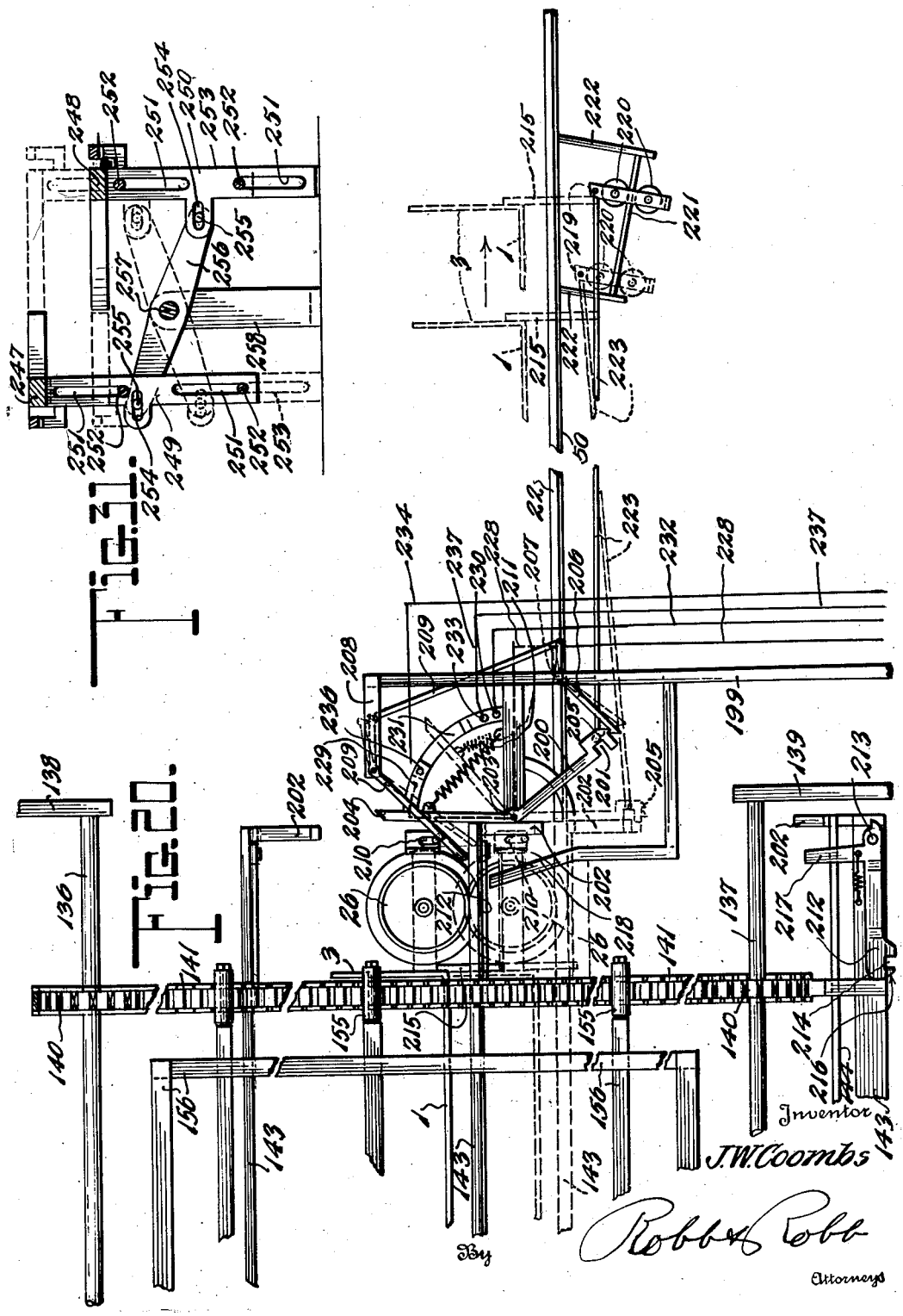

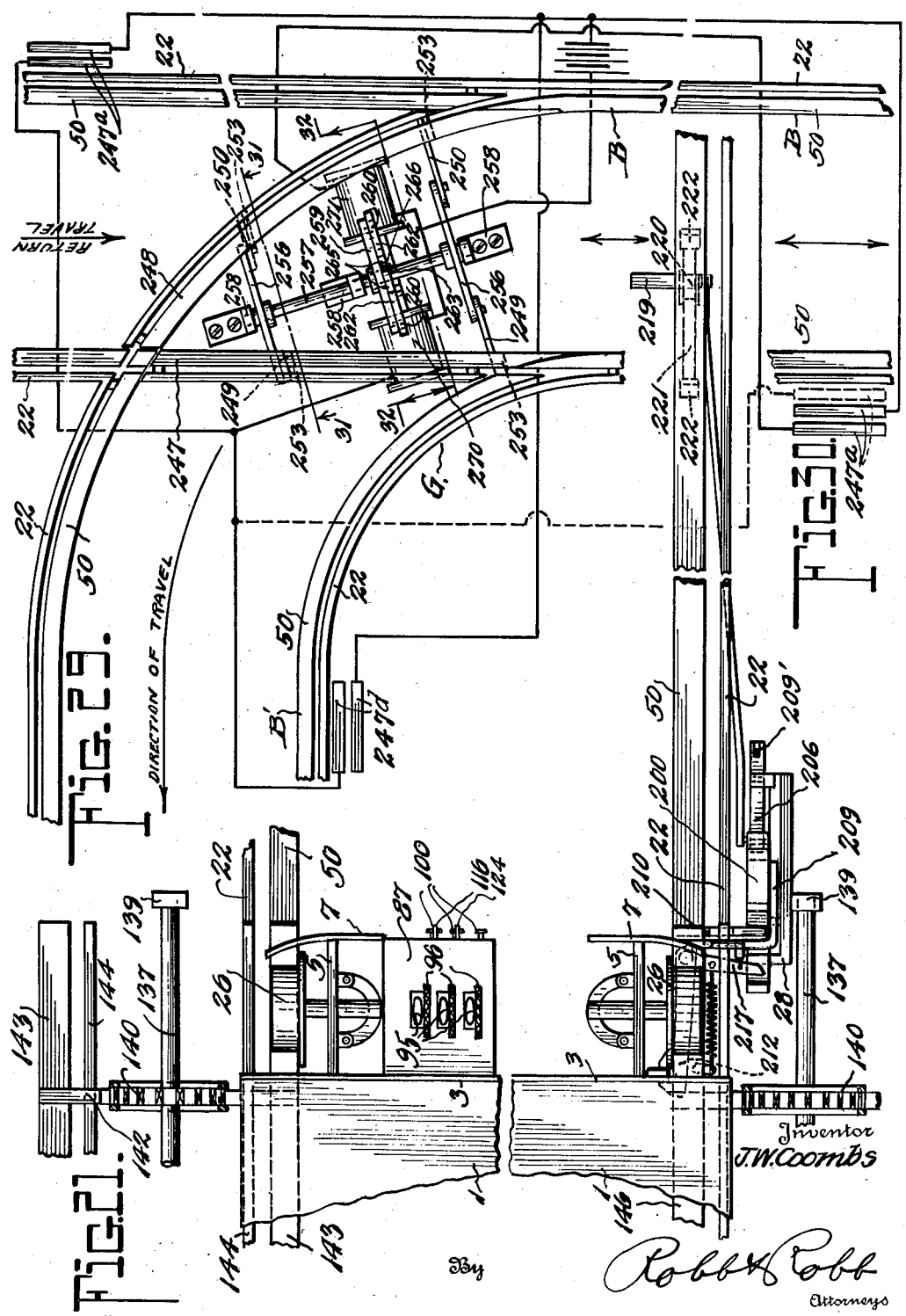

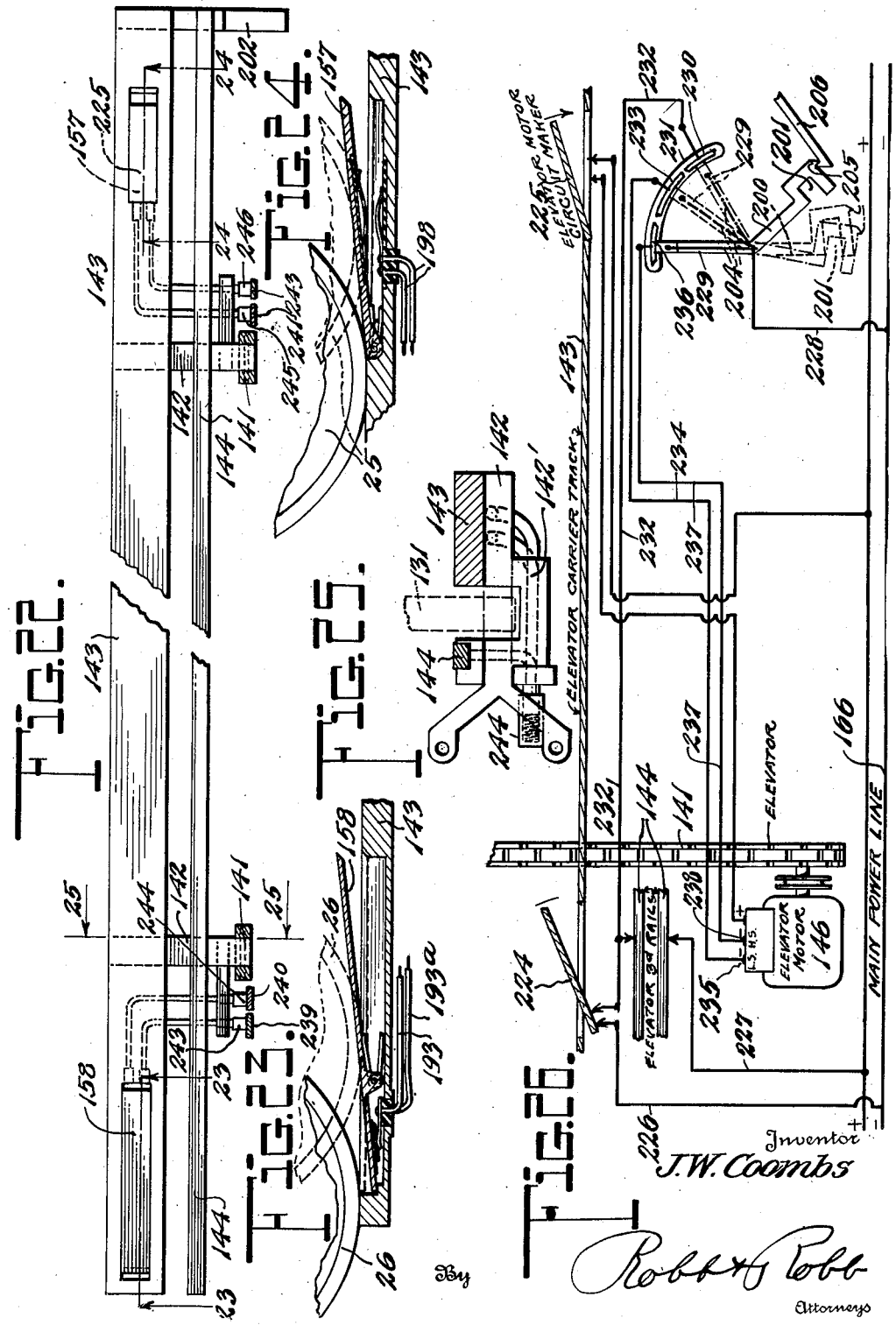

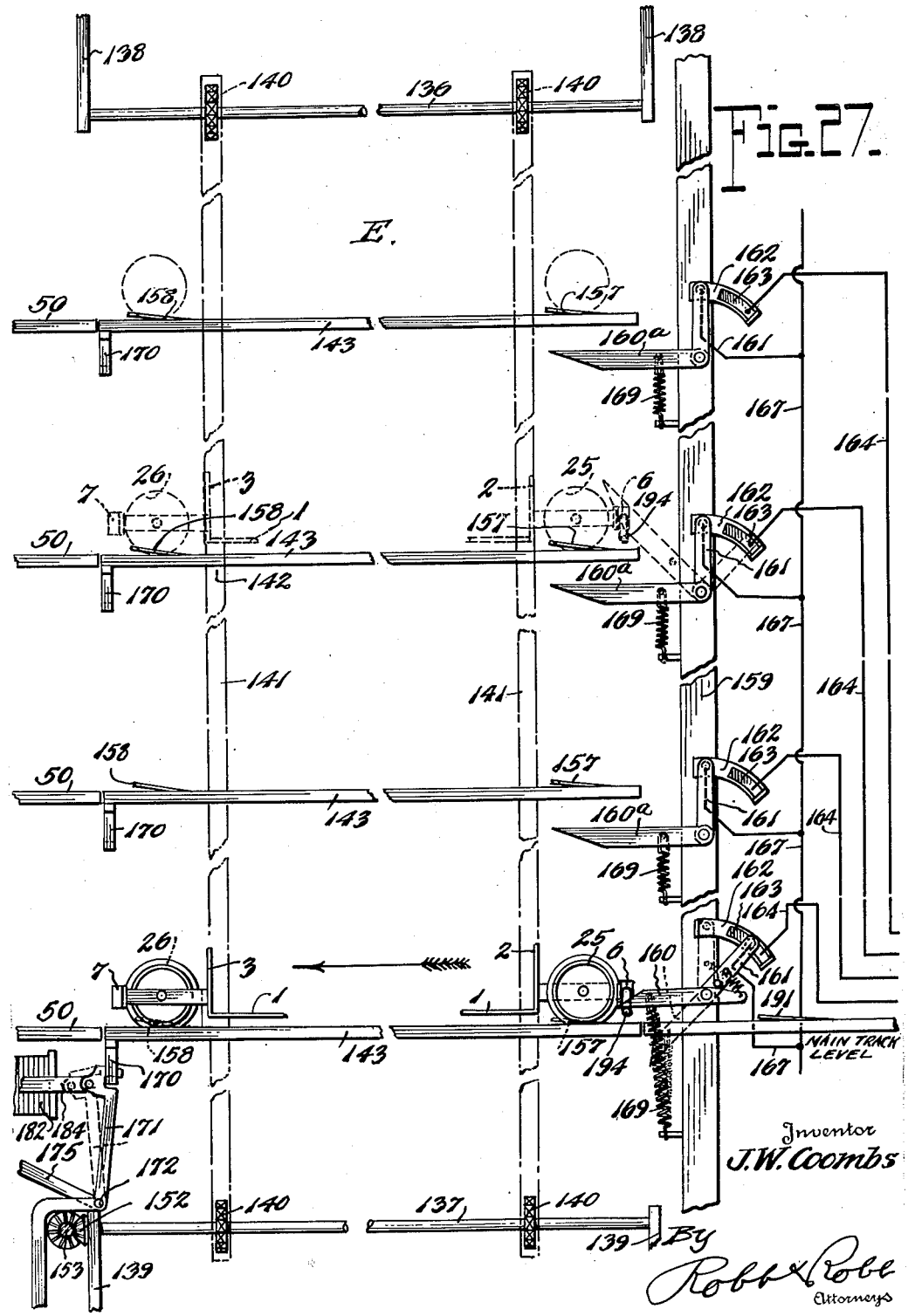

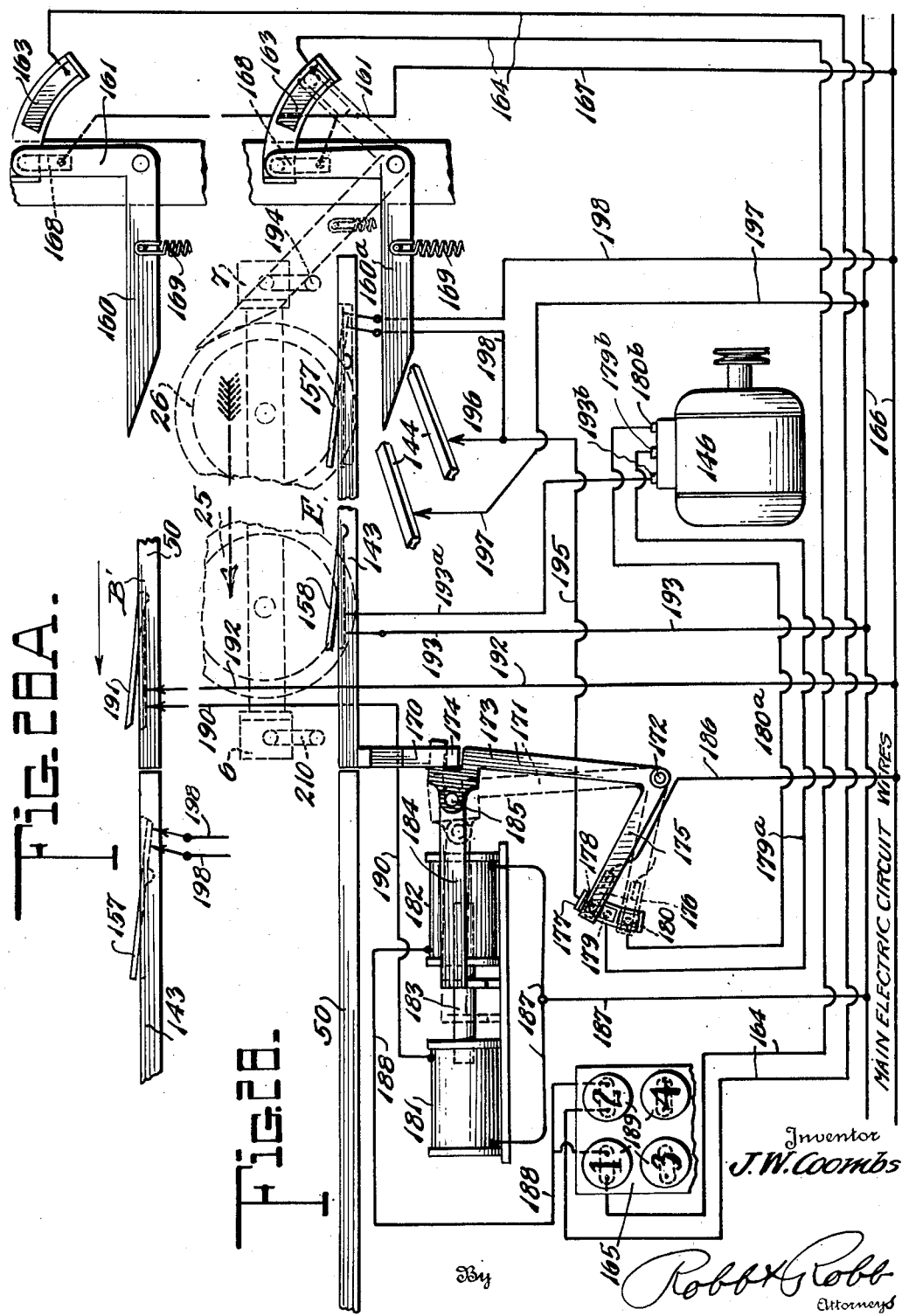

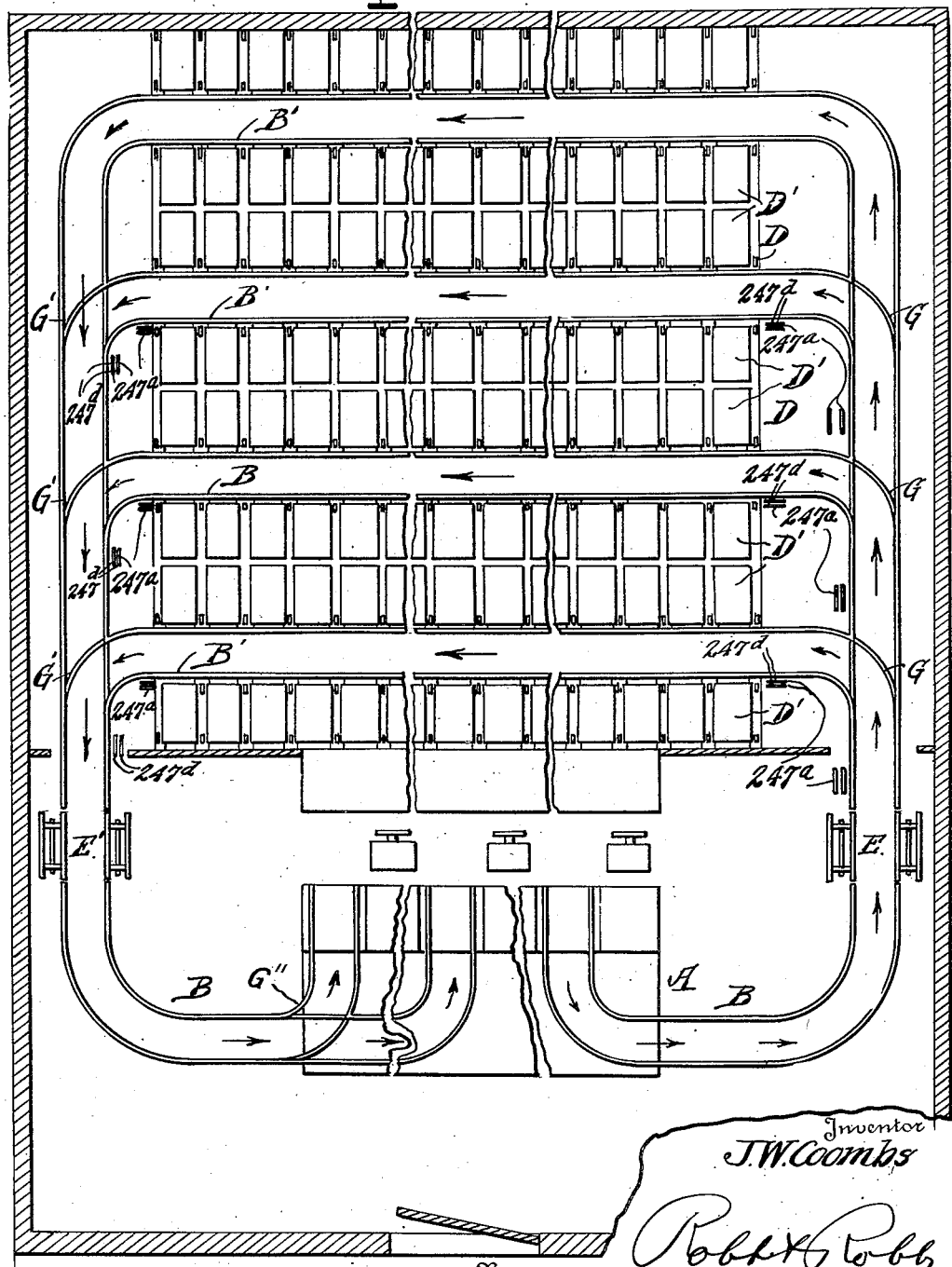

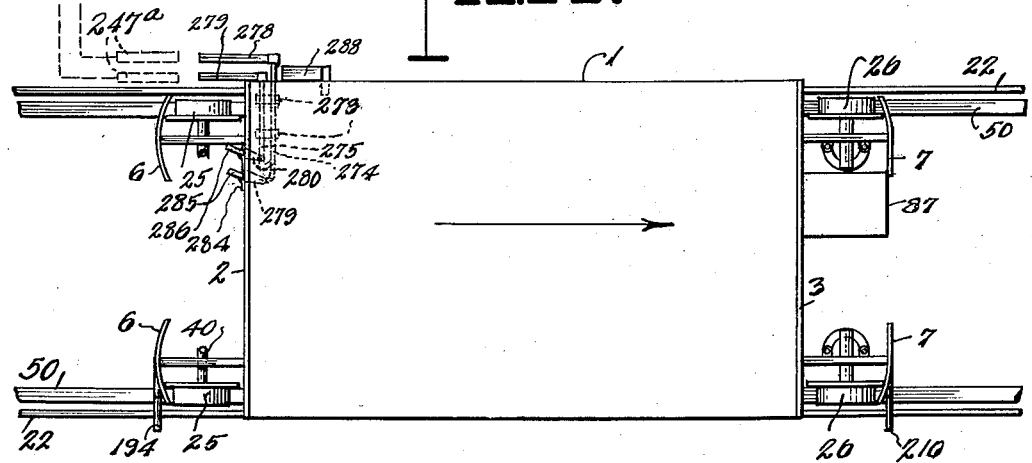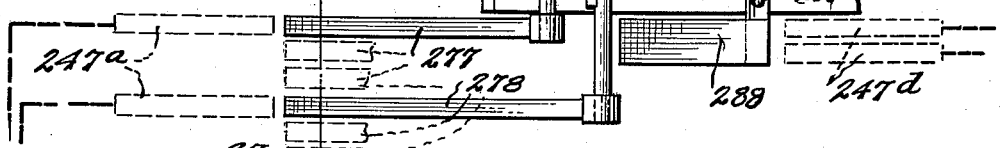

Patented Dec. 21, 1937

2,102,995

UNITED STATES PATENT OFFICE 2,102,995

ARTICLE FILING AND DELIVERY SYSTEM

James W. Coombs, Whitehall, Mich.

Application October 22, 1935, Serial No. 46,154

45 Claims. (Cl. 214—16.1)

The present invention relates to article handling apparatus and is particularly adapted for the handling of files of large office systems. In file systems which embody many hundreds of individual reference files, a great deal of space and file equipment is necessary to take care of the storage of these files, and a very great deal of time and labor is involved in the collection and distribution of these files.

The present invention seeks to reduce space requirements, and the time and labor factors by centralization of the collection and distribution of the file and making these operations substantially all automatically and mechanically performed under the control of a monitor. More specifically my invention contemplates a system of storage files with trackage arrangements to accommodate a self-propelled carrier device having as its prime feature a preselector mechanism by which it may be directed to the particular file desired and by which such file may be extracted or delivered according to the setting of said selector mechanism. An object of my invention therefore is the provision of an automatic filing system in which all of the filing may be done with the least amount of labor and time from the centralized location.

A further object is the provision of conveying means embodying in its construction selector devices for controlling the movement of the conveying means to and from a predetermined point to receive or deliver an article to be conveyed.

A still further object is the provision of control means in association with an article handling device by means of which said device may be directed to a predetermined point or location to automatically pick up the article and deliver it to a centralized control station.

Another object is to provide a delivery system embodying a conveyer device upon which an article may be placed for automatic ejection therefrom when such conveyer device reaches a preselected position or point of delivery.

Another object is the provision in a file storage system composed of different storage levels and a conveying means with a preselector mechanism for controlling the movement of the conveying means to and from the selected levels.

A further object is to provide in a system of the character mentioned a self-propelled conveyer means and means associated therewith for discontinuing the movement of the conveying means and transferring the propelling operation of said conveyor means to a transfer device by means of which said conveying means is raised or lowered to different levels of the storage system.

An additional object is the provision of conveyor means in the nature of a moving vehicle and means for transferring the power from said vehicle moving means to a file selecting and delivery means whereby an article or file may be selectively picked up from any remote point in the system, shifted on to the conveyer and automatically conveyed to a centralized station.

Another object is the provision of a filing system comprising file or article storage compartments or racks located at different levels and having spaced storage corridors or aisle together with elevators and a trackage system leading past said storage compartments to a centralized point and a self-propelled vehicle having a preselector mechanism thereon whereby the vehicle may be automatically dispatched to any desired compartment to automatically withdraw from or return a file to said compartments.

Another paramount object of my improved file system is the conservation of space. By special arrangement the entire space between the floor and ceiling is made available for file storage compartments. Thus my equipment should be unusually valuable and attractive to large business organizations, for their present filing capacity may be practically doubled without requiring any more space than is now required by the present known systems; also dark or poorly ventilated rooms that would ordinarily be very objectionable and impracticable for filing equipment may be availed of.

The entire file system may be constructed in a closed fireproof room or vault having but a single opening and a track leading therefrom to a centralized control station or desk preferably located exteriorly of said vault.

Other and further objects inherent in the present construction will be apparent as the description proceeds and upon reference to the annexed drawings in which like reference numerals refer to like parts.

Figure 1:
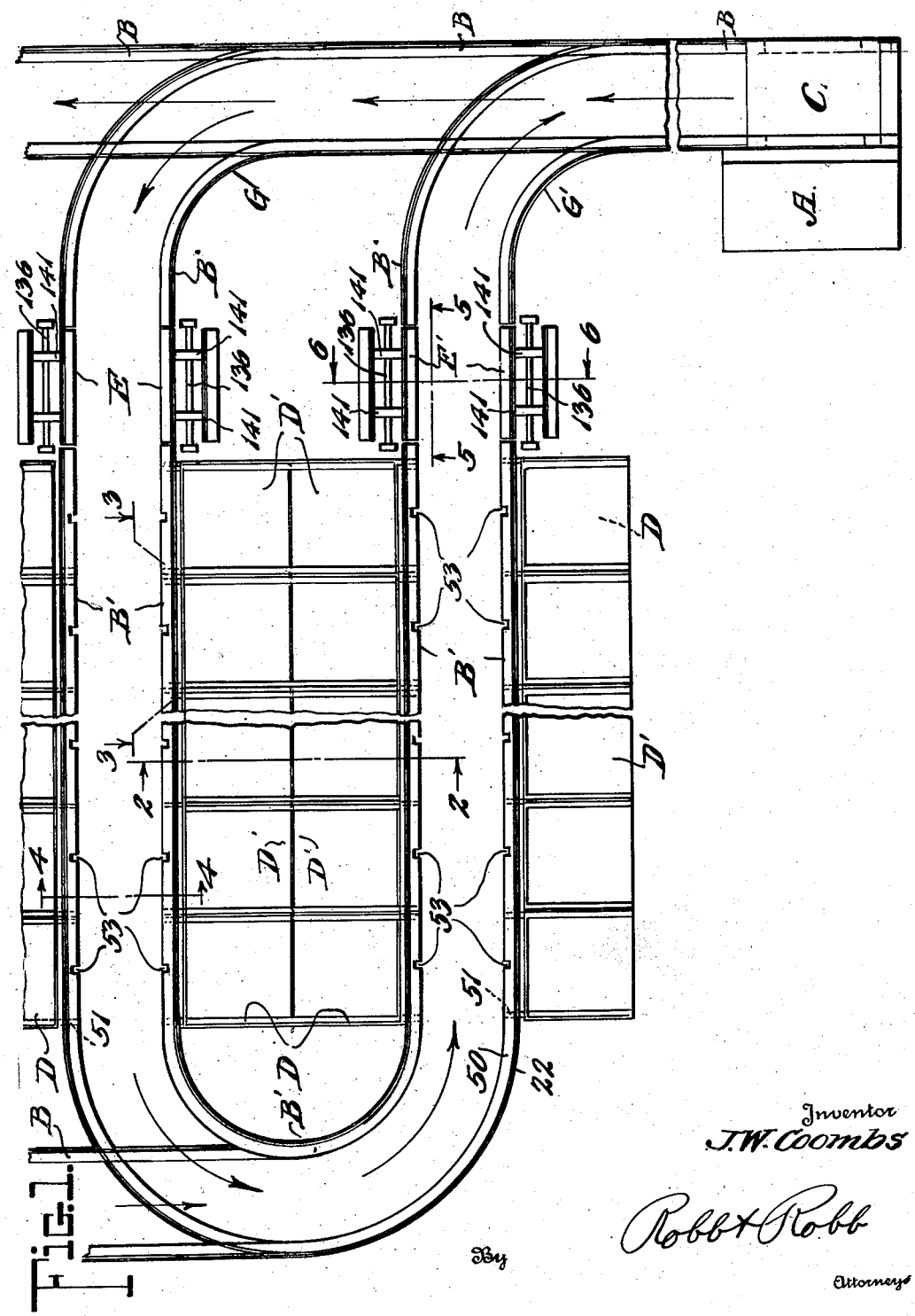
Fig. 1 is a somewhat fragmentary diagrammatic plan view of a storage compartment and trackage layout of a comparatively simple installation of my invention.
Figure 2:
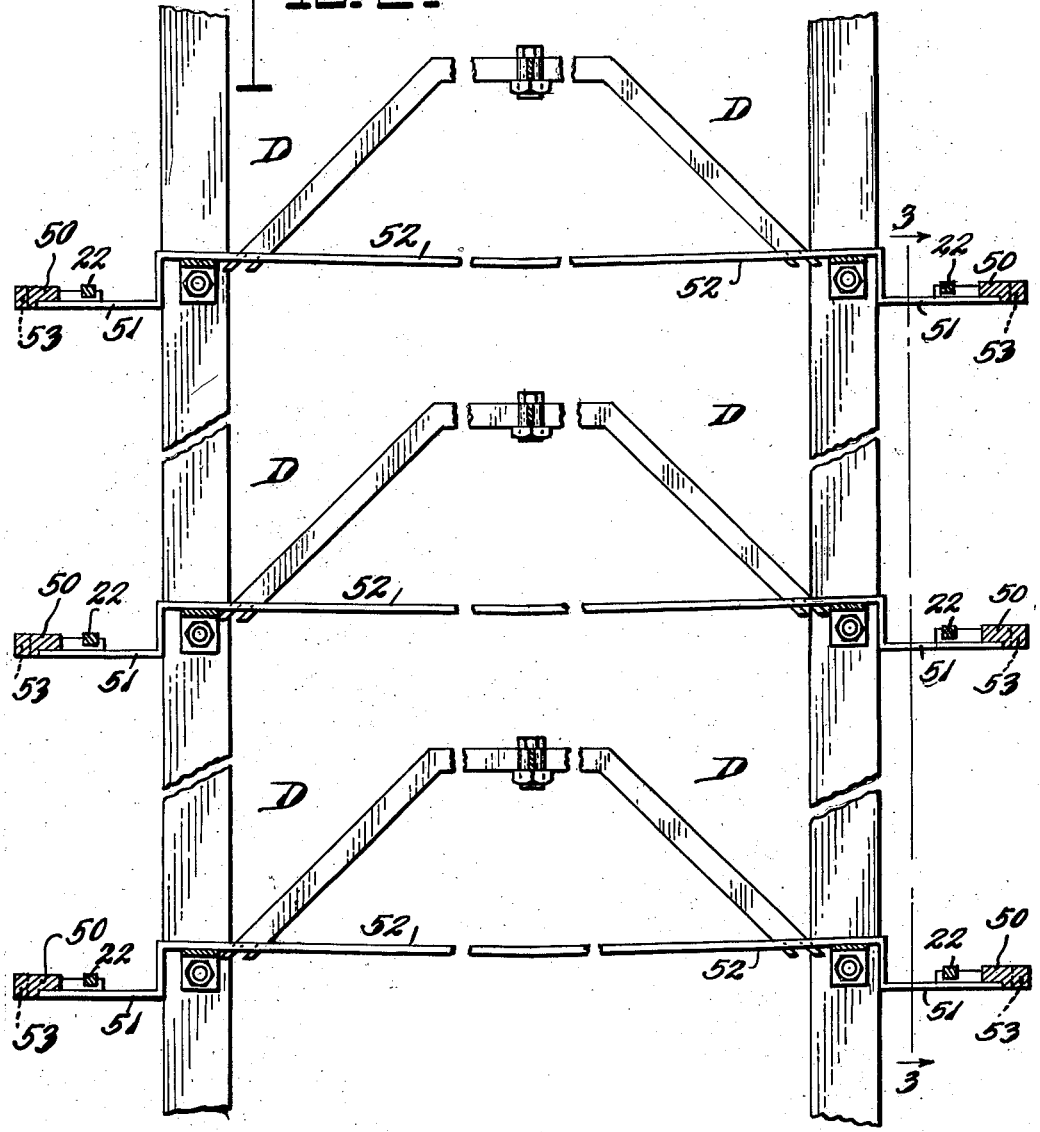
Fig. 2 is a fragmentary vertical sectional view on an enlarged scale and taken approximately on the line 2—2 of Fig. 1.
Figure 4:
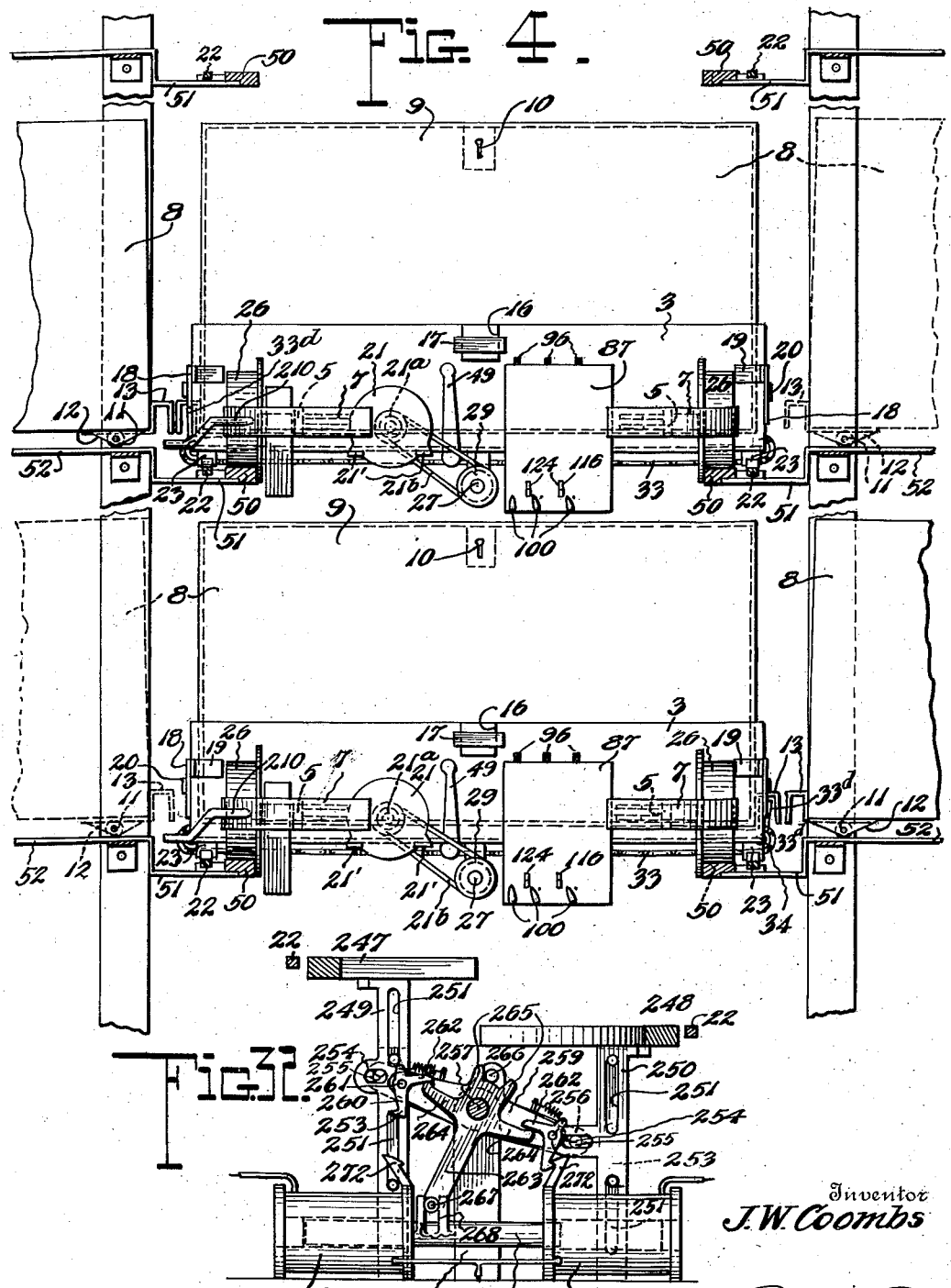

Fig. 4 is an enlarged fragmentary vertical sectional view taken through the filing compartments approximately on a plane as indicated generally by the line 4—4 of Fig. 1, but showing two conveyor vehicles in front elevation with file boxes thereon, the dotted lines indicating the file boxes after they have been shifted by the transfer mechanism located on the vehicle into their respective storage racks.

Figure 5:
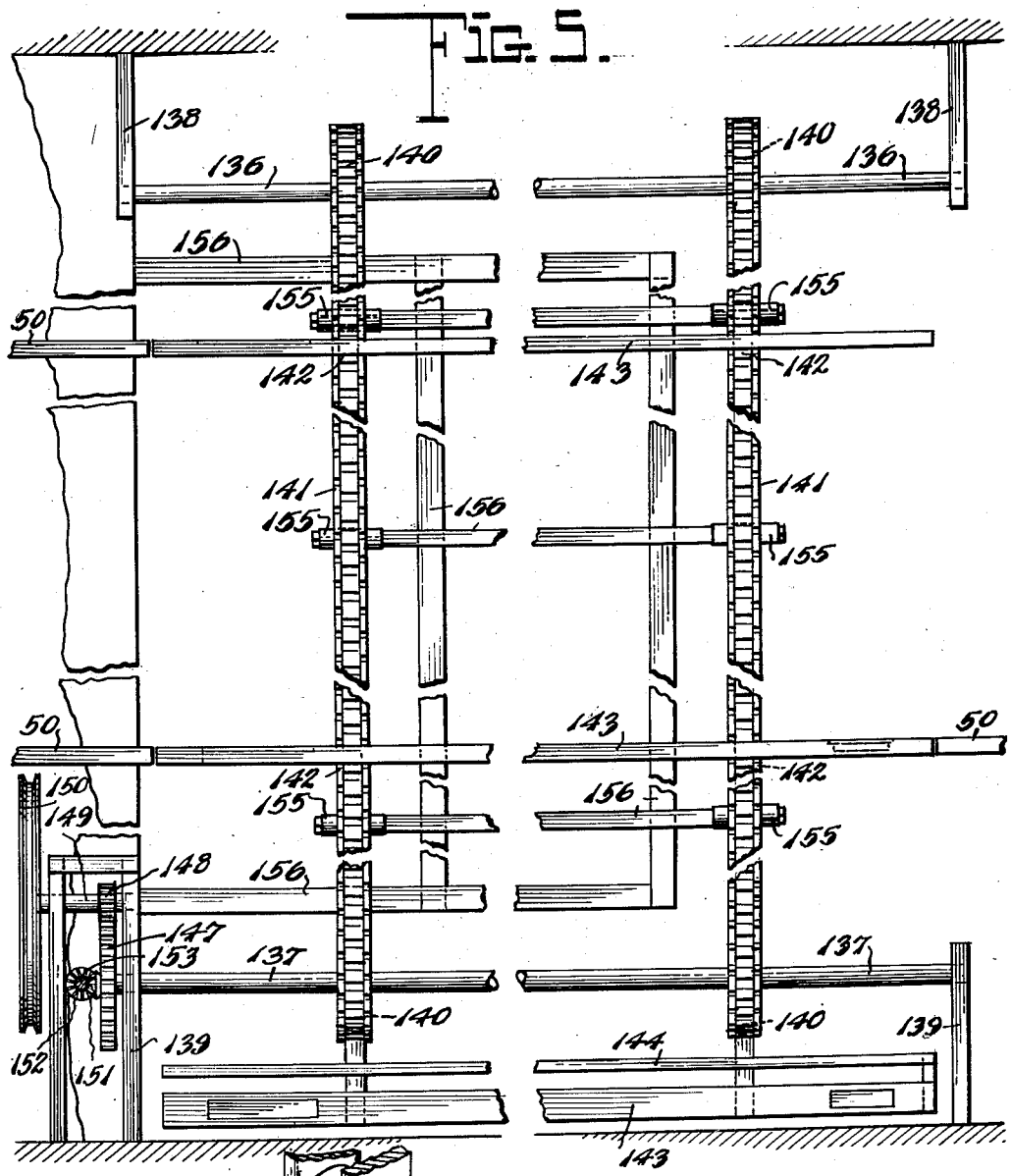

Fig. 5 is a fragmentary vertical sectional view of the down elevator taken approximately on the plane indicated generally by the line 5—5 of Fig. 1.

Figure 6:
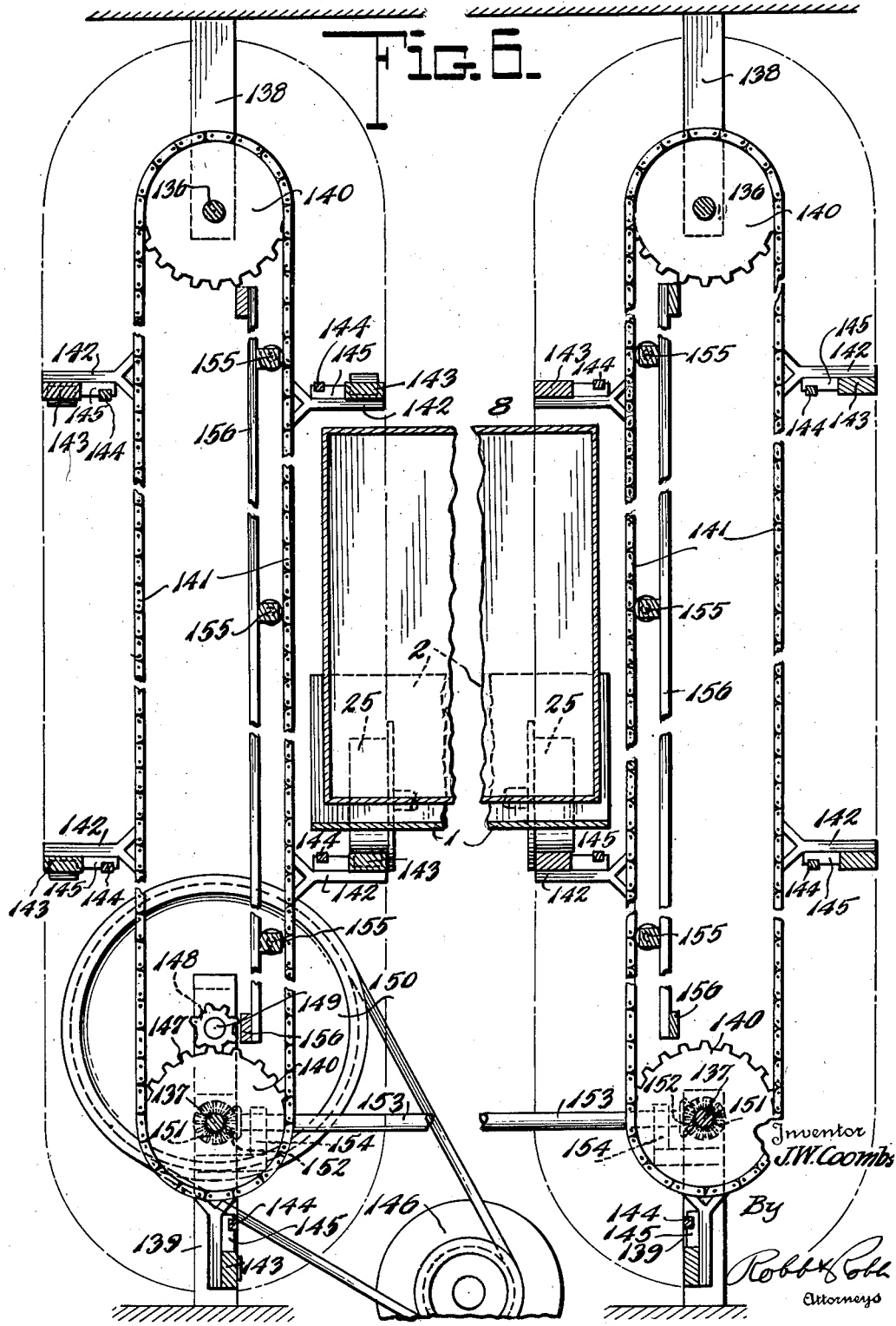

Fig. 6 is an enlarged vertical sectional view of the down elevator taken approximately on line 6—6 of Fig. 1, the parts being broken away or shown in section. A conveyer vehicle is somewhat diagrammatically depicted in the central portion of the figure.

Figure 7:
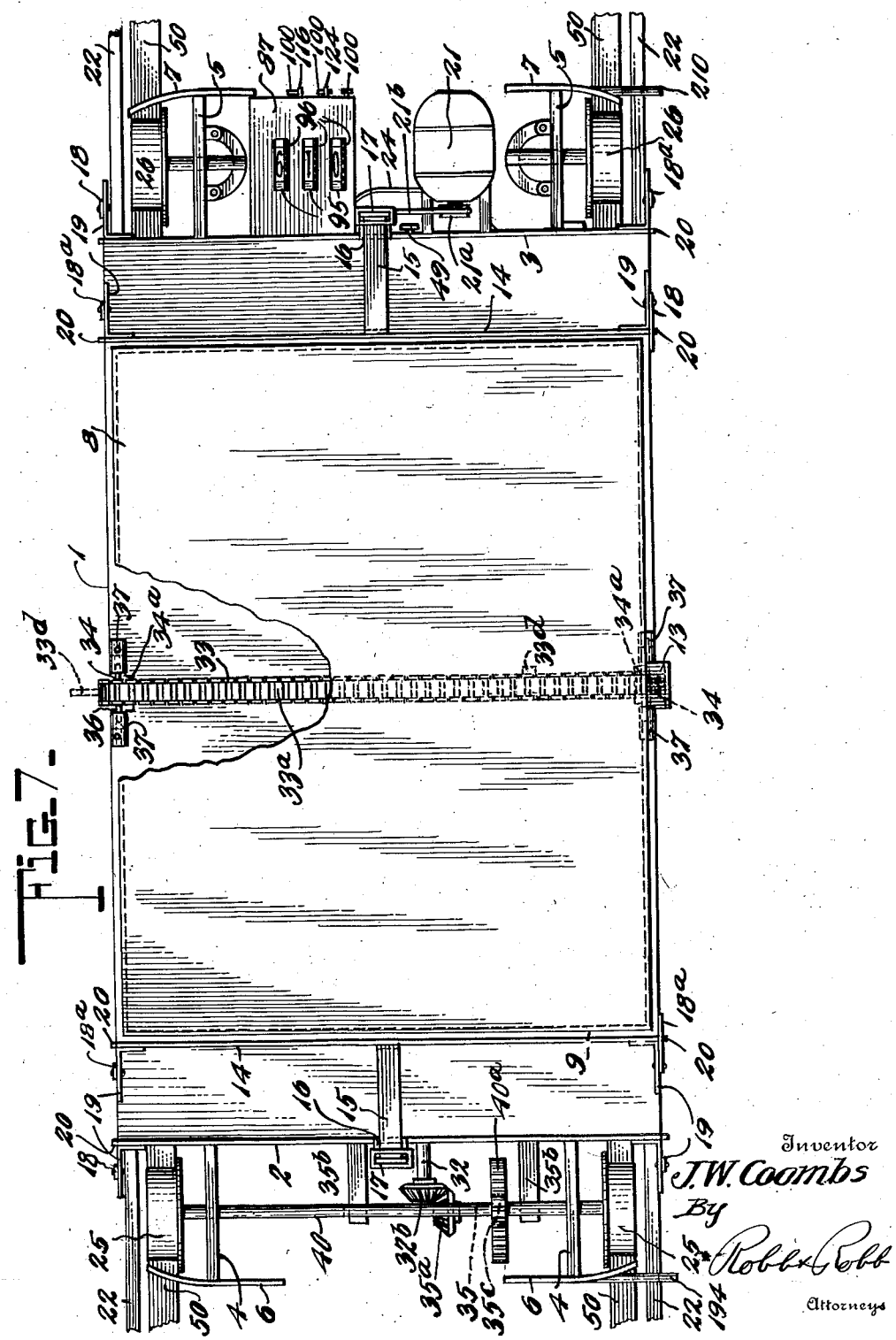

Fig. 7 is a top plan view of the conveyer vehicle having the file box or case disposed thereon which is partly broken away to more clearly illustrate the transfer mechanism on the vehicle.

Figure 8:
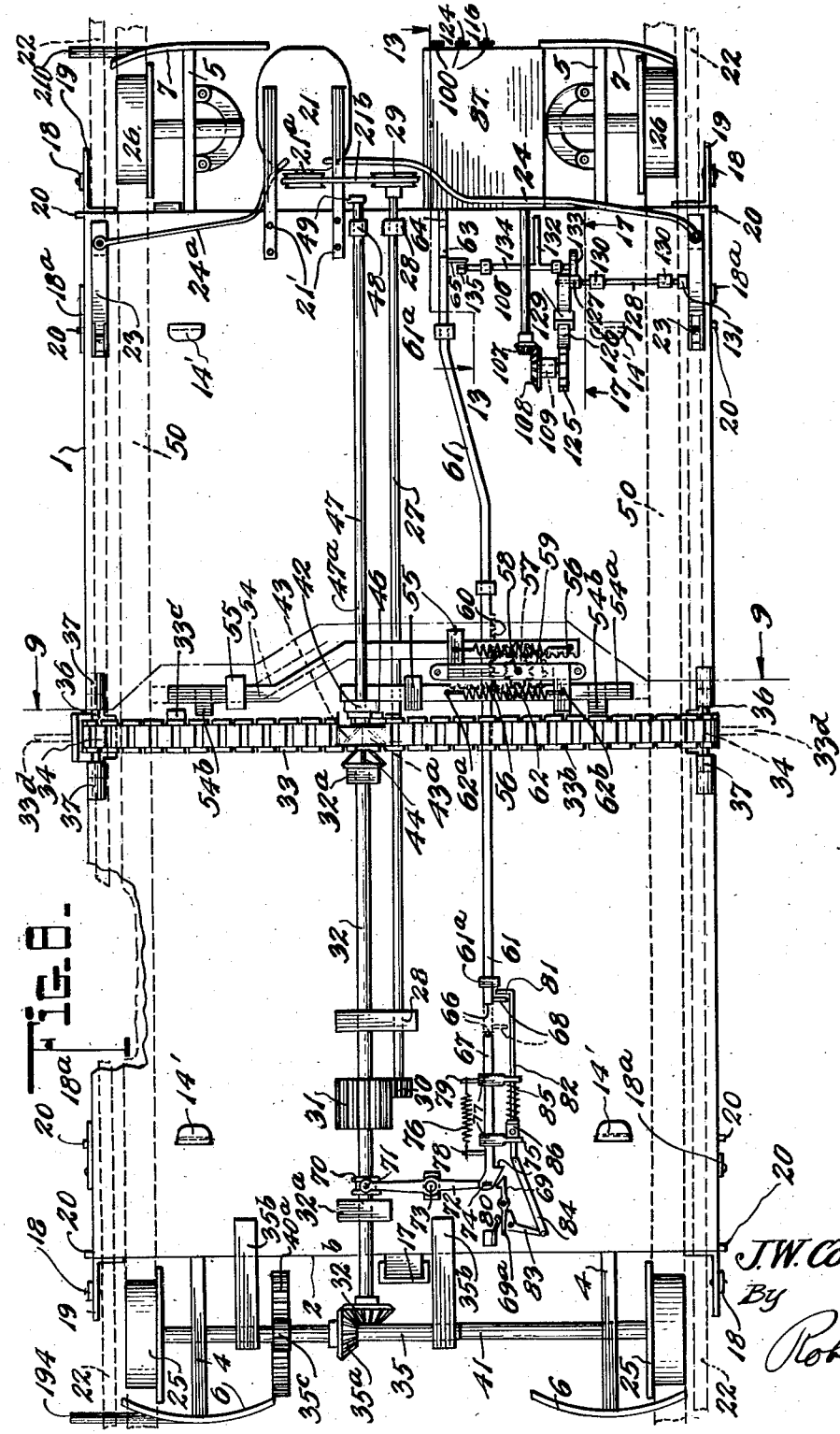

Fig. 8 is a bottom plan view of the conveyer vehicle on a slightly enlarged scale.

Fig. 9 is a vertical sectional view taken through the conveyer vehicle on a plane indicated approximately by the line 9—9 of Fig. 8.

Fig. 10 is an enlarged fragmentary vertical sectional view showing the drive mechanism for the transfer device more clearly illustrating in full lines the reverse mechanism for driving the transfer device in opposite direction.

Fig. 11 is an enlarged perspective view of a portion of the transfer belt or conveyer chain and discloses the removably mounted adjustable transfer pin and one of the latch bar normalizing lugs.

Fig. 12 is a fragmentary horizontal sectional view taken approximately on the plane indicated by the line 12—12 of Fig. 9 and more clearly illustrates the conveyer vehicle latch bar or storage rack alignment mechanism.

Fig. 13 is an enlarged vertical sectional view through the conveyer vehicle selector mechanism taken approximately on the plane indicated by line 13—13 of Fig. 8.

Fig. 14 is a fragmentary perspective view of the latch bar release dog and one of the shifter yokes for the trip finger of the selector mechanism.

Fig. 15 is an enlarged horizontal sectional view on line 15—15 of Fig. 13 showing the preselector disks in elevation.

Fig. 16 is a vertical sectional view taken approximately on the plane indicated by line 16—16 of Fig. 13.

Fig. 17 is an enlarged fragmentary vertical sectional view taken approximately on line 17—17 of Fig. 8.

Fig. 18 is a fragmentary vertical sectional view on line 18—18 of Fig. 17 and more clearly illustrating the preselector actuating mechanism.

Fig. 19 is a vertical sectional view on line 19—19 of Fig. 18 and illustrates the preselector mechanism latch bar release dog and the preselector mechanism drive interrupting lever.

Fig. 20 is a side elevation partly broken away, of the rear portion of the down elevator and more clearly disclosing the stop control mechanism for arresting movement thereof when a track section of the elevator carrying a conveyer vehicle reaches the main floor level.

Fig. 21 is a fragmentary plan view of the construction illustrated in Fig. 20.

Fig. 22 is an enlarged plan view of one of the carrier rails for the elevators and showing certain circuit controlling features therefor.

Fig. 23 is an enlarged sectional view on the line 23—23 of Fig. 22.

Fig. 24 is a similar view taken on line 24—24 of Fig. 22.

Fig. 25 is a cross sectional view on line 25—25 of Fig. 22 and showing a bracket member having an offset portion for the purposes of allowing the carrier selector mechanism actuating arm to pass by the track support without actuation thereof.

Fig. 26 is a circuit diagram for the down elevator.

Fig. 27 is a diagrammatical view of the up elevator and certain of its associated controlling devices.

Fig. 28 is an enlarged diagrammatical detail view of the up elevator circuit wiring arrangement.

Fig. 28a is a fragmentary detail of the up elevator latch bar normalizing contact and its relation with respect to the up elevator track section.

Fig. 29 is a plan view of one of the switches for diverting the carrier from the main track B onto the branch tracks B' and showing diagrammatically the control contacts and circuit therefor.

Fig. 30 is a plan view of certain of the contacts for controlling the switch as shown in Fig. 29 as the carrier approaches the same.

Fig. 31 is a vertical sectional view taken on line 31—31 of Fig. 29.

Fig. 32 is a similar view, but taken on line 32—32 of Fig. 29.

Fig. 33 is a detail fragmentary perspective view of one of the elevator chains.

Fig. 34 is a diagrammatic plan view of a modified arrangement of my filing system.

Fig. 35 is a top plan view of one of my file carrier vehicles showing more clearly the switch selector carried thereby, other details of the carrier being omitted for the sake of clearness.

Fig. 36 is an enlarged fragmentary bottom plan view of the left rear portion of the carrier, more clearly showing the mounting of the switch contact member.

Fig. 37 is a fragmentary sectional view taken on line 37—37 of Fig. 36.

Referring to the drawings and more particularly to Fig. 1, my improved file system contemplates the installation of the centralized control station or filing desk A to and from which all filing is accomplished. This station is preferably conveniently located and accessible to the members of the organization employing my system so that the file clerks or monitors are preferably stationed at this point to receive the files from or dispatch the files to the storage racks and also to keep proper notation, index records, and the like of these files.

Conveniently located with respect to the station A is preferably a section of my conveyer vehicle trackage system indicated generally at B and B' and on which the conveyer vehicle C, later to be described in detail, is adapted to travel. In the embodiment as illustrated, a single track system is depicted, the direction of travel being indicated by the arrows. This trackage system extends to the file compartments or racks D disposed in any desired convenient location adjacent the tracks B or B' in order that the conveyer vehicle may be dispatched to any one of these compartments and the file case or box D' returned into the compartment or withdrawn therefrom and conveyed to the central station for further distribution if so desired. The file or article storage space comprises individual racks D preferably arranged in tiers on either side of the tracks B' hereinafter designated as branch tracks.

It is contemplated within the purview of my invention to provide a plurality of these branch tracks located adjacent the article storage racks, one for each level. In this arrangement I preferably make use of an elevator system including an up elevator E for raising the conveyer vehicle to the desired level on which the particular file rack to which the vehicle is being dispatched is located.

This up elevator is preferably disposed at the entrance to the branch track system B' while at the exit end is also disposed a second or down elevator E'. If it is desired, suitable switches G may be provided for directing the conveyer vehicle from the main trackage system B on to the branch tracks B' and towards the up elevator E. Also suitable switches G' may be provided for guiding the returning vehicle back again on to the main tracks.

Assuming that a file is desired, the monitor at the central station will consult the records at that location in order to ascertain the number or location of the file in the storage system. He will then adjust the selector mechanism carried by the conveyer vehicle in accordance with the location of the file. The conveyer vehicle is preferably of the self-propelled type and after being dispatched from the central station A travels on the main track B until it reaches the switch leading to the aisle or corridor in which the rack containing the desired file is located.

The switch G may be controlled by the attendant at the central station or desk or it may preferably be controlled by the vehicle. The vehicle is thus guided by the switch on to the branch track B' and on to the up elevator where the motive power operating the wheels of the vehicle is discontinued, bringing the vehicle to a stop on the elevator. Assuming that the selected file is on a higher level than the main track, the elevator is then automatically set into operation elevating the vehicle to said level. The elevator drive is now automatically discontinued and power simultaneously supplied to the vehicle whereupon it continues in the direction of the arrows in Fig. 1 and under the control of the selector mechanism thereon. When the preselected file rack is reached the motive power to the vehicle is automatically transferred to a transfer mechanism carried by the vehicle, which mechanism is actuated to withdraw the desired file from the selected rack.

Suitable latch or stop means are provided for automatically and positively maintaining the vehicle in proper alignment with the rack during the operation just mentioned. The transfer belt has suitable normalizing means which function to transfer the power that drives said transfer belt back to the vehicle driving means after the file has been fully withdrawn from the rack and is loaded on said vehicle.

The vehicle now continues its travel along the branch track in the direction of the arrows until it reaches the exit portion thereof where it passes on to the down elevator and at this point the propelling power is again automatically discontinued and its travel arrested. Simultaneously the prime mover for the down elevator is energized causing the vehicle to descend to the main track level where the elevator prime mover is automatically stopped and the vehicle prime mover energized to cause the vehicle to continue its trip to the switch G', on to the main track, and back to the central station at which point the file or article selected may be removed for its desired purpose.

In order to return a file to its proper storage space or rack, the aforementioned operation is repeated with the exception that the transfer belt on the vehicle is adjusted to operate in a reverse direction. When the vehicle reaches the preselected storage space or rack it will automatically stop and the transfer belt will be caused to move in reverse direction to shift the file from its position on the vehicle into the proper file compartment or rack.

Since the above is a brief general description of my improved file system and a general operation thereof, I will now proceed to describe more in detail certain features of my construction for the purpose of carrying out my invention as depicted in the drawings.

It is to be understood, however, that the form of my invention herein shown and described is to be taken as a preferred example of the same and that various changes in the shape, size, and arrangement of parts may be resorted to without departing from the spirit of the invention as contemplated by and within the scope of the appended claims.

*File carrier*

Figure 3:
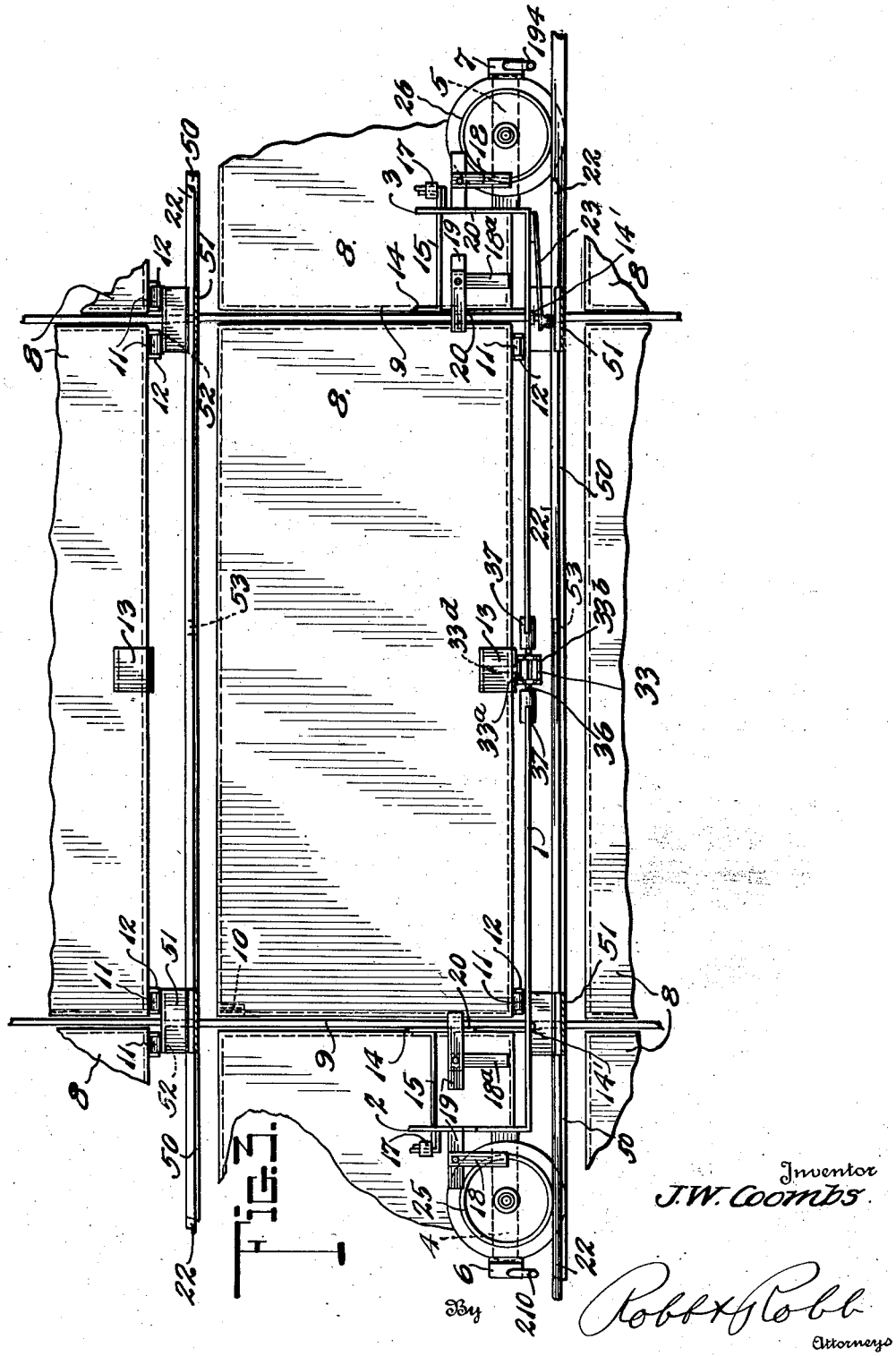
Fig. 3 is a fragmentary vertical sectional view taken approximately on the line 3—3 of Fig. 1 showing the conveyor means or vehicle disposed on the tracks in position for replacement or withdrawal of the file or article from a storage rack or compartment.

Referring more particularly to Figs. 3, 4 and 7 my conveyer vehicle or file carrier C comprises a body 1 preferably formed of sheet material and having upturned ends 2 and 3 from which project the combined bumper and axle supports 4 and 5 to the extremity of which are suitably secured the rear and front bumpers 6 and 7.

For the purpose of illustration, I have disclosed what may be termed a combination carriage or conveyer vehicle which is designed to handle either the letter size or legal size files, and also a combination of both of these sizes. The file papers or articles to be stored are placed in boxes or containers 8 of sufficient size to properly enclose the same. These boxes are preferably of light sheet material and have a hinged flap or closure member 9 at one end thereof provided with a suitable lock 10. A master key is preferably employed which will unlock all of the boxes and this key may be kept in the custody of the file clerk or monitor at the central desk A.

Rollers 11 are suitably journalled in brackets 12 fixed to the bottom of the file boxes adjacent the corners thereof to support the boxes for travel to and from the file racks and on the supporting surface of the body 1 of the conveyer vehicle. A withdrawal or replacement tongue or hook member 13 is suitably secured to one side of the box intermediate its ends so as to project slightly beyond the face of the box, the purpose of this member 13 being later explained.

When it is desired to file letter-size boxes, I preferably make use of a pair of filler plates or guides 14 which may be removably mounted on the body 1 in any desired manner, such as by tongue projections 14' insertable through suitable openings formed in the body for this purpose. A lateral brace member 15 is provided which may be secured to the central edge portion of each of the plates 14 and in which event will be removably secured in a notched portion 16 formed in the front and rear upturned ends 3 and 2, a retaining member 17 being provided for this purpose.

Each of the front and rear upturned ends 3 and 2 is provided with what I term a stop latch 18 pivoted to a bracket 19 secured on the upturned ends and adapted when in operative position to rest on a stop latch support 20 projecting from the side of the upturned ends. The ends of the filler plates 14 are also provided with similar stop latches 18a. The purpose of these latches is to limit the movement of the file box as it is shifted from the file rack on to the carriage to prevent the same from moving too far and thus projecting beyond the side of the carriage. The latches are adjusted at the central desk by simply flipping them on to their supports or out of the way as desired.

The front end of the carrier C carries a motor or prime mover 21 suitably supported by brackets 21' projecting from the body and is supplied with electricity from electrified third rails 22 to brushes or contact members 23 secured to but insulated from the bottom of the body 1, suitable conductor wires 24, 24a being provided which connect the brushes 23 with the motor. The purpose of this motor is to furnish tractive power for driving the rear wheels 25 and also to furnish power for withdrawing the file boxes from the racks or replacing them therein. This mechanism will later be explained.

The front of the carrier or conveyer vehicle is also provided with wheels 26, it being contemplated that these wheels may be of the vehicle steering type if so desired. Referring more particularly to Fig. 8, a main drive shaft 27 is suitably journalled in the brackets 28 depending from the bottom of the body 1. One end of this shaft has fixed thereon a drive belt pulley 29 through which power is transmitted from the motor drive pulley 21a on the motor through the instrumentality of the belt 21b. The other extremity of the shaft 27 has fixed thereon a drive pinion 30 meshing with a larger elongated pinion 31 fixed to what I term a clutch shaft 32.

This shaft 32 is longitudinally shiftable to perform two functions, namely to drive the rear wheels 25 and to drive the lateral conveyer chain or belt or transfer device 33 later to be explained.

The shaft 32 is suitably slidably and rotatably journalled in guide bearings 32a and 28 and has secured to one end thereof a bevel gear 32b normally meshing with a corresponding bevel gear 35a fixed to the short or jack shaft 35. This jack shaft is journalled in the brackets 35b and carries thereon a spur gear 35c meshing with another spur gear 40a secured on the rear axle 40 of the conveyer vehicle.

It is to be understood that any suitable differential rear axle drive mechanism may be incorporated in my apparatus to permit a full traction drive at all times to both rear wheels. Such device being well known in the art and forming no part in this invention, I have not illustrated the same since, for purposes of illustration, a positive drive to only one of the rear wheels should be sufficient.

*Transfer mechanism*

The purpose of this transfer mechanism 33, as before pointed out, is to withdraw file boxes D' from or return said file boxes to the racks or compartments D. The transfer mechanism includes an endless belt or transfer chain indicated generally at 33, one reach 33a extending across the top of the body in closely spaced relation thereto while the other or lower reach 33b lies adjacent the bottom of the body as clearly seen in Fig. 9.

Suitable sprockets 34 are provided around which the transfer chain is trained, said sprockets being disposed in notches 34a formed in the edges of the body, these sprockets being carried on shafts 36 journalled in the bearings 37 secured to the body or plate 1 adjacent the side edges thereof.

The transfer chain 33 is provided with a pair of spaced latch bar normalizing lugs 33c projecting from one side thereof, and an intermediately disposed adjustable file box hook engaging pin or arm 33d. A detailed illustration of this pin and its mounting is disclosed in Fig. 11 of the drawings where it will be observed that its position may be adjusted with respect to the normalizing lugs 33c so that it may be positioned nearer one or the other of said lugs. This adjustment is necessary depending upon whether it is desired to withdraw a file from or return the file to its rack, the adjustment being made by the file clerk at the central station.

Freely journalled in a depending bracket 42 on the bottom of the body 1 and in axial alignment with the longitudinally shiftable clutch shaft 32 is a clutch sprocket or gear 43 designed to normally engage the transfer chain 33. This sprocket is provided with an internal jaw clutch face 43a adapted to be engaged by the clutch member 44 secured to the inner or front end of the longitudinally shiftable shaft 32.

By reference to Fig. 8 of the drawings it will be observed that when the shaft 32 is shifted to the right or forwardly, a drive relation is established between this shaft and the clutch sprocket 43. A second pinion 45 is provided which is also adapted to engage and under certain conditions mesh with the conveyer chain or belt and is hereafter termed a reverse pinion. This pinion is carried by a pivotally mounted lever arm or bracket 46 and is disposed in constant meshing relation with the clutch gear 43, the bracket being pivoted concentrically with the axis of rotation of this gear.

The shifting mechanism for swinging the bracket 46 to engage or disengage the reverse gear with the transfer belt comprises a shifter crank or rod 47 carried in brackets 48 in alignment with the axis of gear 43 and having an offset or crank portion 47a fixed to the pivotally mounted bracket 46 at one end. A manual adjustment lever 49 is secured to the outer front end of the rod 47, said lever extending upwardly in front of the upturned front end 3 of the vehicle body. By shifting the free end of the lever 49 the gear 45 may be shifted to thus interpose this gear between the gear 43 and the transfer chain 33 and thus obtain a reverse drive for said chain.

The conveyer vehicle travels on tracks or rails 50 forming a part of the trackage system B and B', said rails preferably extending past the compartments or racks D in which the file boxes D' are stored. (See Fig. 4.) These tracks are suitably supported on bracket extensions 51 formed on the storage rack rails 52 forming a part of the storage compartment framework and on which the rollers 11 of the file boxes ride after they leave the conveyer vehicle. Each of the rails 50 is formed with file compartment alignment notches 53 preferably disposed in a predetermined position in front of each of the file box storage racks. These notch portions in the rails are provided to receive the ends of the latch bars 54, 54a carried adjacent the transfer belt 33 on the underside of the vehicle.

These latch or stop bars 54, 54a are slidably mounted for longitudinal movement in guide brackets 55, each having a rack portion 56 meshing with a pinion gear 57 fixed on a shaft 58 rotatably carried by a plate 55a forming a connecting member between two of the brackets 55. A second larger pinion 59, also fixed to the shaft 58, meshes with the rack 60 formed on a clutch shaft shifter rod 61, this rod being slidably mounted in bearing guides 61a projecting from the body. Each of the latch bars 54, 54a is also provided with a normalizing lug or return arm 54b disposed in the path of movement of the normalizing lugs 33c on the transfer belt 33. Springs 62 are provided for urging the latch bars outwardly to their extended positions in the notches 53 in the rails 50, the springs being secured at one end to the latch bars as indicated at 62a while the other ends of said springs are secured to the brackets 55 at 62b.

One end of the clutch bar shifter rod is formed with a latch engaging shoulder 63 for engagement with the release latch 64 of the preselector unit later to be described. Located adjacent the shoulder 63 is a lateral projection or pin 65 the purpose of which will be explained later. The other extremity of the rod 61 constitutes an abutment member or shoulder 66 for shifting the clutch shifter bar 67 rearwardly or to the left as seen in Fig. 8. Adjacent the abutment face 66 is a latch release pin or projection 68 designed to release the clutch shaft shifter bar retaining latch, later referred to, when the shifter rod 61 is moved toward the right or front of the carriage.

The clutch shaft 32 has secured thereto a grooved collar 70 for the receipt of pins 71 carried by the bifurcated extremities of the shifter yoke 72 pivoted at 73 to the bottom of the body 1. The opposite end of the yoke is provided with a pin and slot connection 74 securing the left or rear end of the clutch shifter bar 67 thereto. The bar 67 has formed thereon adjacent the rear end just referred to, a cam shoulder or abutment 75 for engagement with the retaining latch 69 upon movement of the bar 67 to the left and for holding the clutch member 44 in driving engagement with the clutch face 43a of the transfer belt drive sprocket 43.

Spring means 76 is provided, connected to the shifter bar 67 at 78 and to one of the guide brackets at 79 for the purpose of shifting the bar 67 to the right or forwardly upon release of the latch 69 and to thus cause meshing engagement between the bevel gears 32b and 35a. The tail 69a of the latch 69 is engaged by the latch spring 80 to cause engagement of the parts 69 and 75 when the bar 67 is shifted rearwardly or to the left. (See Fig. 8.)

Upon movement of the rod 61 to the right, the pin 68 is adapted to engage the bent end 81 of the latch bar release rod 82 connected to the latch cam lever 83 by a link 84. A return spring 85 is provided for returning the release rod, one end bearing against one of the guide bearings 77 while the other end engages a collar 86 formed on the rod.

From the foregoing and with reference to Fig. 8 of the drawings it will be observed that means are provided for holding the latch bars in their retracted position, this means comprising a selector mechanism now to be described which controls the operation or tilting of the release latch 64 for freeing the latch bars 54 and 54a.

*Selector mechanism*

The selector mechanism comprises a casing 87 suitably disposed on the forward end of the carrier vehicle and illustrated more in detail in Figs. 13–16. The release latch 64 is mounted on a square shaft 88 extending between the end plates of the casing 87 and is journalled therein. A plurality of latch actuating arms 89 are slidably mounted on the shaft 88, a shifter yoke 90 being provided for moving the latch actuating arms 89 to operative or inoperative position with respect to the selector discs later referred to. Spring 91 connects an arm 92 with a lug 93 secured to the bottom of the casing and tends to rotate the shaft 88 to the right moving the latch member 64 upwardly into engaging position with respect to the latch bar release rod 61. Journalled on a shaft 94 which extends through the casing in parallel relation to the shaft 88 are a plurality of preselector disks 95, each being provided with a setting flange 96 and an indicia carrying rim 97 on which suitable indicia is indicated, as disclosed in Fig. 15 of the drawings. The indicia carried on these disks are numerals ranging from 0 to 9 and with the three disks illustrated any number up to 999 can be selected, these numbers representing the locations of the files within the file compartments along the tracks. Each of the preselector disks carries a pin projection 98 arranged to actuate the latch actuating arms 89 once in every revolution of the disk providing, of course, that said actuating arm has been positioned in the path of the pin 98.

The means for shifting each of the latch actuating arms 89 into and out of operative relation with respect to pins 98 on the disks includes the shifter yoke 90, and shafts 99 to which the yoke is secured. The shafts 99 are suitably journalled in the lower portion of the casing as clearly seen in Fig. 13 and project therethrough, the forward extremity of the shafts having setting arms 100 fixed thereon.

As before mentioned, the arrangement shown in Figs. 13 to 16 comprises three preselector wheels or disks, a units disk, a tens disk and a hundreds disk. These are sufficient to take care of any number from 1 up to 999, but in systems where a greater number of files are stored, one or more additional disks may be used.

Each selector disk is rotated with relation to its adjacent disk at a ratio of 1 to 10 or, in other words, the unit disk must make one full revolution in order to rotate the tens disk $\frac{1}{10}$ of a revolution while the tens wheel must make one full revolution to $\frac{1}{10}$ of a revolution of the hundreds disk. The units wheel 95a is driven by a bevel gear 101 fixed thereon from a corresponding bevel gear 102 carried on the vertical driving shaft 103. The lower end of this shaft has fixed thereon the bevel gear 104 meshing with a bevel gear 105 on the forward end of the preselector drive shaft 106 suitably journalled in brackets on the bottom of the body 1. The rear end of the shaft 106 has fixed thereon a second bevel gear 107 meshing with a larger bevel gear 108 carried on one end of the selector actuating shaft 109 which shaft is also journalled in brackets on the bottom of the body 1. The drive ratio between the two gears 107 and 108 is substantially 2 to 1 in order that a faster drive is established to the selector mechanism.

The file boxes having the even filing numbers are preferably located on the right hand side of the track while those having the odd numbers are oppositely located on the other or left hand side of the track. It is therefore desirable to have the preselector mechanism function to stop the carrier in the same position for each pair of odd and even numbered storage compartments. The preselector mechanism will therefore trip the carrier stop mechanism at substantially the same position on the tracks for the even numbered boxes as for those having the odd numbers. To effect this control the disks 95 are moved two numbers at a time. The large or double size bevel gear 108 meshing with the smaller bevel gear 107 is for this purpose.

On the opposite side of the units disk 95a is fixed a small pinion 110 which meshes with a pair of meshing gears 111 and 112 carried by a standard 113 fixed to the casing 87. The pair of carry over gears 114, 115 are journalled in side by side relation on a swinging lever 116 pivoted at 117 to the bottom of the casing. The opposite end of the lever extends through a slot in the front of the casing so that it may be adjusted by the file clerk or monitor at the central desk. The gears 114 and 115 are of the same size, the gear 114 being normally in meshing relation with the gear 112, while the other gear 115 is in meshing relation with the larger ring gear 118 on the periphery of the adjacent tens selector disk 95b. The gears 114 and 115 must be shifted out of meshing engagement with the ring gears on the selector disks in order to permit the disks to be freely rotated for the purpose of initially setting up the desired file number on the disk. The gear ratio between the gear 110 on the first or units disk and the large gear 118 just referred to is such that ten revolutions of the units disk 95a causes the second or tens disk 95b to make only one revolution, as before stated.

The second disk 95b has a drive pinion 110a similar to the pinion 110 on the first disk. This pinion 110a meshes with a pair of meshing gears 119, 120 carried by the standard 121 projecting upwardly from the base of the selector casing. A second pair of carry over gears 122, 123 are journalled on a second pivoted lever 124 similar in every respect to the carry over mechanism between the first and second disks. The hundreds wheel 95c is similar to the tens wheel 95b in that it carries the large ring gear 125 which is adapted to mesh with the carry over gear 123. This arrangement drives the hundreds wheel at a 1 to 10 ratio with respect to the tens wheel or at a 1 to 100 ratio with respect to the units wheel.

When it is desired to set up a number of the file box that is wanted the operator or file clerk moves the carry over gears out of mesh with respect to their respective ring gears on the selector disks. This is done by lowering the ends of the levers 116 and 124. The selector disks 95a, b and c may now be freely rotated and the number set up as indicated by the indicia on the rim 97 by manipulation of the setting flange 96. If the number selected has three figures then all of the disks illustrated must be used while with a number less than ten only one disk is used. The file clerk in setting the selector mechanism must also adjust the setting arms 100 in order to position the proper latch actuating arm in the path of its pin 98 in order that the release latch 64 will be tripped at the proper time. The drive actuating mechanism for the preselector device will now be described. The opposite end of the shaft 109 carrying the large gear 108 has fixed thereon a ratchet wheel 125 having ten teeth. This wheel is given a step by step or intermittent rotation by the ratchet member 126 pivoted to the free end of the actuating arm 127, said arm being fixed to one end of the rock shaft 128. Interposed between the end portions of the ratchet member 126 is an insulating member 129 which electrically insulates one end of the ratchet member from the other end.

The shaft 128 is suitably journalled in the brackets 130 insulatively attached on the body 1 and extends to one side of the body as clearly seen in Fig. 18. Depending from and fixed to the other end of the rock shaft 128 is an actuator arm 131 positioned to extend downwardly between the track and the third rail as clearly illustrated in Fig. 18 of the drawings. This actuator arm is disposed in the path of the track supporting brackets 51 located between the storage compartments. As the carrier passes along the track past each storage compartment the actuator arm 131 strikes the track supporting brackets rocking the shaft 128 which causes the ratchet member 126 to actuate the ratchet wheel 125 and thus rotate the shaft 109 one increment of movement. Since the gear 108 on this shaft is twice the size of the gear 107 with which it meshes, the shaft 106 will thus be rotated ⅕ of a revolution moving the unit number wheel or disk 95a up two numerals.

In the operation of the selector mechanism the number of the desired file is set up on the disks 95 and as the carrier proceeds along the track the selector disks are intermittently actuated through the above described mechanism which gradually moves the disks 95 back to their 0 position. The pins 98 are so located with respect to the indicia on the disk that they will actuate the latch actuating arm 89 to rock the release latch 64 downwardly to free the latch bar 61 upon movement of the numbers one or two back to zero. This operation of course permits the stop mechanism for the carrier to function upon registration of the notches 53 with the latch bars 54, 54a.

It is preferable that the selector mechanism remain at 0 during the return trip. If the selector mechanism continues to operate after the file is withdrawn or returned, considerable unnecessary wear on the parts will take place. Also when the carrier is dispatched to file compartments having very low numbers the selector mechanism might be tripped several times as the carrier proceeds back to the central desk. Upon return of the carrier to the central desk, the operator can note the position of the selector disks and if these register 0 or 1 this may constitute a check for the clerk indicating that the correct file number was set up on the mechanism.

In order to prevent further actuation of the rock shaft actuator arm, I provide the cam member 133 secured to one end of the shaft 134. The cam member is disposed adjacent the rear face of the actuating arm 127 so that rotation of the shaft will cause the cam to swing the arm 127 to the right. This operation also swings the actuator arm 131 to the right and upwardly above the plane of the track supporting brackets 51. The shaft 134 has fixed at its other end an actuating arm 135 disposed in the path of the pin 65 on the latch bar release rod 61. It will be observed from Fig. 13 that when the disks are turned to 0 and one of the pins 98 rocks the shaft 88, the release latch 64 is depressed freeing the latch bar release rod 61 and permitting the same to move rearwardly as the latch bars move out against the inside of the carrier rails 50. This operation moves the projection 65 to the left rocking the actuating arm 135 to the left and thus rotating the shaft 134 which in turn causes the cam 133 to cam the arm 127 rearwardly or to the right, swinging the actuating arm out of operative position with respect to the track brackets 51. A return spring 127a extends between the actuating arm 127 and the ratchet member 126 for the purpose of holding the ratchet member in operative engagement with the ratchet wheel 125 and returning the actuator arm to operative position after it has passed over one of the track support brackets 51.

The design of the cam 133 is preferably such that after the cam has been rotated in the manner just described it will so remain until the file clerk resets the same by grasping the setting lever 132 projecting from the shaft 134 in any suitable location.

Elevator details

As has been previously pointed out, the mechanism for conveying the carrier to the different storage levels comprises an up elevator which receives the carrier from the main track level and elevates the same to a preselected level to which the carrier is to be dispatched. This elevator is preferably of the automatic type in that it remains at rest until the carrier rolls thereon whereupon certain circuits are closed by the operation to cause the carrier to be elevated. As the elevator reaches the preselected storage level, power to the elevator motor is automatically discontinued and certain locking devices are operated to positively lock the elevator in proper alignment with the tracks leading to the storage compartment which has been selected. After the carrier has traveled to the proper storage compartment and the file withdrawn therefrom or returned thereto the storage level track preferably leads to a second elevator which I term the down elevator.

There are certain general features about these two elevators which are similar, namely the supporting shafts, contact members, locking devices and motor driving means, and for this reason certain of these mechanisms will be given the same reference numerals and will not be described in very great detail in my description of the down elevator.

Referring more particularly to Figs. 5, 6, 20, and 21, both of these elevators comprise upper and lower supporting shafts 136 and 137 suitably journalled in brackets 138 depending from the ceiling of the room in which the filing system is located, and brackets 139 extending upwardly from the floor or other suitable supporting surface. Fixed to the shafts 136 and 137 at suitably spaced positions are the elevator chain sprocket wheels 140 over which the elevator chains 141 are trained. Track supporting bracket arms 142 are suitably secured to the elevator chains at spaced intervals, the distance between the brackets being the same as the distance between the various storage compartment levels so that when the elevator comes to rest the track sections therein will be in exact alignment with the track sections located at the different storage compartment levels.

The elevator chains 141 are of particular formation as clearly disclosed in detail in Fig. 33 so that they can bend in one direction only, namely around the sprockets 140, but where the straight reach is, between the sprockets, the chain is prevented from sagging and thus the brackets 142 are rigidly held in right angle relation with respect to the reach of the chain. The brackets 142 support the short elevator track section 143, later to be described in detail, and also constitute the supporting means for the elevator third or conductor rails 144 suitably insulated from the supporting brackets by the insulating blocks 145.

The brackets 142 which support the elevator track sections 143 for the up elevator are slightly different in construction with respect to the brackets for the down elevator. That is to say, the brackets for the up elevator are formed somewhat in the manner shown in Fig. 25 and have an offset portion 142' as shown in full lines of this figure for the purpose of allowing the selector mechanism actuating arm 131 to pass by these brackets without actuation of the arm. The brackets for the down elevator do not necessarily carry the offset portion 42, but may be made straight as shown in dotted lines in this figure.

I preferably utilize electrical motors 146 for supplying power to drive each of the elevators, these motors being connected in automatic electric circuits later to be described. One of the lower supporting shafts 137 has fixed thereon a gear 147 meshing with gear 148 fixed on the elevator drive shaft 149. This shaft has a large V-belt pulley 150. A drive belt extends from this pulley to a smaller pulley located on the shaft of the motor 146.

In order to operate each pair of the elevators, one on either side of the track, the shafts 137 each carry bevel gears 151 meshing with similar bevel gears 152 carried by the cross shaft 153 suitably supported in bracket bearings 154. The brackets 154 are carried by the supporting brackets 139 for the shafts 137. Suitable guide rollers 155, carried by a supporting frame 156, constitute means for assisting and maintaining the operative reach of the elevator chains in proper vertical alignment.

Up elevator

The up elevator is somewhat diagrammatically illustrated in Figs. 27 and 28, but the specific details of construction of this elevator as well as those of the down elevator are more clearly illustrated in Figs. 5, 6, 21, and 22 of the drawings.

The track sections 143 of the up elevator each carry a wheel operated circuit breaker 157 and a similarly operated circuit maker 158. The purpose of the circuit breaker 157 is to temporarily break the circuit to the conductor rails 144 on the elevator while the purpose of the circuit maker 158 is to establish under certain conditions a circuit which furnishes current to the electric motor 146 which drives the elevator.

A vertically disposed supporting standard 159 is positioned adjacent the forward end of the right hand elevator unit, this standard having positioned thereon a plurality of pivoted actuating levers 160, 160a. These levers constitute actuating means for the contact arms 161. Segmental contact carrier plates 162 are secured to the supporting standard 159, the plates being formed of insulating material and having disposed thereon the contact members 163 each of which is connected by an electrical conductor 164 extending to preferably a push button switch board 165 located at the central station or desk.

Referring now more particularly to Fig. 28 of the drawings current is supplied from one of the main conductor wires 166 through the conductor 167 to the contact member 168 carried by the contact arm 161. Spring means 169 are provided for urging the levers 160, 160a to the left or in anticlockwise direction. It will be observed from the foregoing that the levers just mentioned and their contact arms are normally in inoperative or non-contacting position, but when rocked to the position shown in dotted lines in Fig. 28 a circuit will be established between the conductor wire 167 and one of the wires 164.

The rear end of each of the right elevator track sections, taken in conjunction with the direction of movement of the carrier, has fixed thereto a depending angular latch engaging bracket arm 170 which is adapted to be engaged by the elevator stop latch 171 upon alignment of the elevator track sections with their respective branch tracks. This elevator stop latch is pivoted at 172 and comprises an arm 173 having the notched extremity 174. A second contact namely an arm 175 is also carried by the elevator stop latch 171, having secured thereto in insulated relation a contact member 176.

A segmental plate 177, preferably of insulating material, having fixed thereon three contact plates 178, 179, 180 is disposed so that the contact member 176 on the arm 175 may be shifted to engage any one of these plates. The elevator stop latch 171 may be operated by any suitable means, but for purposes of illustration I have depicted a pair of solenoid magnets 181, 182 having an armature 183 to which is secured an operating link 184, which link is in turn connected at 185 to the end of the stop latch 171. When the magnet 181 is energized the armature 183 will be moved to the left thus disengaging the notched end 174 from latch engaging bracket 170 and simultaneously establishing a contact between the contact members 176 and 180.

When the magnet 182 is energized, the armature 183 will be moved to the right thus rocking the latch 171 to the right where it will engage the side of the latch lever 170, and thus said latch will be held in intermediate position with the contact member 176 in engagement with the contact member 179. Upon alignment of the elevator track sections with the branch track, the notched extremity 174 will permit the latch 171 to swing farther to the right and thus positively lock the track sections in this aligned position. Under these conditions circuit connection will be established between the contact 176 and 178 as seen in full lines in Fig. 28 of the drawings. The contact plates 179 and 180 are connected respectively by the conductors 179a, 180a to the low and high speed terminals 179b, 180b of the motor 146.

Current is supplied from the main circuit conductors 166 through the conductor 186 to the contact member 176 on the elevator stop latch arm 175. One terminal of each of the magnets 181 and 182 is connected through the conductors 187 to the main circuit conductor wires 166. The other terminal of the magnet 182 is connected through a conductor 188 to each of the push buttons or keys 189 located on the switch board 165. The other terminal of the magnet 181 is connected through a conductor 190 to a circuit maker 191. When this circuit maker is depressed by the wheels of the vehicle, it establishes a circuit from the magnet 181 through the conductor 190 and the conductor 192 to the main conductors 166. This circuit maker or contact device is located on the main track adjacent the entrance to the elevator so as to be depressed by the wheels of the vehicle just prior to the movement of said vehicle on the elevator.

Current is supplied to the motor 146 from the main circuit by a conductor 193 which leads to one terminal of the contact member or circuit maker 158, the other contact member being electrically connected by the circuit carrying wire 193a to the terminal 193b on the motor.

The rear right bumper of the carrier has secured thereto an actuating arm 194 which projects across the plane occupied by the several levers 160 and 160a so that these levers may be engaged and lifted by the carrier arms as the elevator ascends with the carrier disposed thereon. In describing the operation of the up elevator it is to be assumed that the file clerk at the central desk depresses one of the push buttons or keys 189 to select the proper storage compartment level to which the carrier is to be dispatched. The depression of the key establishes a circuit connection between the main circuit wires 166 and one of the contact plates 163 so that when the carrier rolls on to the elevator and depresses the circuit maker 158 current will pass along the conductor wire 193 from the main circuit wire through the circuit maker, the wire 193a to the motor terminal 193b.

From there current passes from the high speed terminal 180b through the wire 180a, to the contact plate 180 and through the contact plate 176 on the contact carrying arm 175, wire 186 back to the other main circuit wire or conductor 166. The elevator stop latch is of course in the dotted line position during the operation of the elevator.

Current is also carried by the circuit wire 167 to all of the contacts 168 on arms 161. However, a circuit connection to one of the plates 163 can only be made through the depression of one of the push buttons 189. Upon depression of the push button 189 marked with the number 2, current will pass from the main circuit through the conductors 187 to the magnet 182 and from thence through the conductor 188 to a contact member which is engaged by the push button 189. From thence current flows through the circuit 164 to the plate 163.

It should be observed that the circuit is not complete until the lever 160a actuates the arm 161 which carries the contact 168 for moving on to the plate 163. When this circuit is thus closed the magnet 182 will be energized, moving the armature 183 to the right. This shifts the stop latch to a position intermediate the full and dotted line showings in Fig. 28 with its face thereof in engagement with the latch engaging bracket 170. Under these conditions the contact 176 is shifted off of the high speed contact 180 and on to the low speed contact 179 permitting current to flow through the conductor 179a and to the low speed motor terminal 179b. The elevator is thus slowed up in its ascent until the bracket 170 reaches the notched portion 174 in the elevator stop latch 171.

The magnet still being energized forces the latch 171 to the right with the bracket in engagement with the notch as clearly seen in full lines in Fig. 28. Under these circumstances the contact member 176 is shifted on to the contact plate 178 which establishes a circuit connection to the third or conductor rails 144 on the elevator. Current now flows from the main circuit wires 166 through the conductor 186, circuit wires 195 and 196 to one of the third or conductor rails. Here it is passed through the contacts on the bottom of the carriage and through the motor on the carriage to the opposite conductor rail where the current passes along the conductor 197 back to the main circuit conductors 166.

The motor on the carriage now being energized, the carriage rolls off of the up elevator and on to the branch track section disposed at the particular level selected. As the carriage moves off of the elevator, the circuit or contact maker 158 moves upwardly as shown in full lines in Fig. 28, thus breaking the circuit between the conductors 193 and 193a leading from the main circuit to the motor terminal 193b. Movement of the carrier off of the elevator also releases the circuit breaker 157 which moves to the full line position in Fig. 28 establishing the circuit connection through the conductors 197 and 198. Of course, it should be observed that as the carriage moves away from the lever 160, the spring 169 returns the lever to its full line position thus moving the contact 168 off of the contact plate 163 and interrupting the circuit to the magnet 182, the stop latch remaining in its bracket engaging position until another carrier approaches the elevator.

The parts thus remain in the full line position until another carrier approaches the elevator whereupon the contact maker 191 is depressed just prior to the movement of said carrier on to the elevator track section. This causes the circuit to be closed from the main conductor wires 166 through the conductors 192, 190, magnet 181, conductor wires 187 back to the main circuit. Magnet 181 now being energized swings the stop latch 171 to the left, disengaging the notched portion 174 from the bracket 170 and shifting the contact 176 on to the contact plate 180. This conditions the elevator for operation. However, no movement of the elevator can take place until the carrier moves thereon depressing the circuit maker 158 and actuating the circuit breaker 157. The operation of these two devices simultaneously establishes a circuit connection to the motor and breaks the circuit connection to the third or conductor rails on the elevator.

The lever 160 adjacent the elevator and located on the main track level is actuated incident to the movement of the carrier on to the elevator rather than by the upward movement of the carrier. If the push button indicating the main floor level is depressed, it should be observed that no movement of the elevator can occur since the lever 160 will be shifted to remove the contact arm 161 on to the contact plate 163 for this level and the magnet 182 will be energized before any elevation of the carrier can take place and thus positively hold the elevator track section having the carrier thereon in alignment with the branch track leading therefrom and located on the main track level.

*Down elevator*

As before mentioned, the down elevator is of an entirely automatic type in that it remains at rest with its track sections in alignment with the branch track sections leading to the various storage compartment levels and upon movement of a carrier from any one of the branch track sections on to the down elevator its motor will be energized to lower the carriage.

The descent of the carrier will continue until it reaches the main track level whereupon the elevator will be stopped in exact alignment with the main track and current established to the elevator conductor rails to cause the carrier to move from the elevator on to the main track and back to the central desk.

Adjacent the exit end of this down elevator is disposed a supporting standard 199 on which an elevator stop lever 200 is pivoted. This stop lever carries at one end a bracket engaging notch 201 for engagement with the bracket arm 202 carried by the exit ends of each of the track sections on the right hand elevator unit. The elevator stop lever is pivoted at 203 and is provided with a contact carrying extension 204, the purpose of which will be later described. The elevator stop latch proper is provided at its extremity with a shoulder 205 which is adapted to engage the retaining latch member 206 pivoted at 207 to the supporting standard 199. This latch member just described is designed to hold the elevator stop lever 200 in set position.

Disposed at the upper extremity of the supporting standard 199 is an arm 208 to which the latch trip lever 209 is pivoted, a link 209' connecting the outer extremity of the latch 206 with the trip lever 209. The trip lever is positioned to be engaged by an actuating arm 210 projecting from the right front bumper of the carrier.

With reference to Fig. 20 of the drawings it will be observed that the carrier descends on the elevator. The arm 210 engages the trip lever 209 as the particular elevator track section carrying the carrier approaches the main track level. Depression of the trip lever 209 causes the link 209' to be pulled, thus rocking the latch 206 out of engagement with the notch 205 on the elevator stop lever 200. The stop lever now swings to the left under the influence of the spring 211 causing the portion of the lever between the pivot and the notched end to engage the side of the elevator bracket arm 202. Shifting of this stop lever to the position just described breaks the circuit to the high speed terminal of the elevator actuating motor and establishes the circuit connection to the low speed terminal in the manner similar to the circuit arrangements as described in connection with the up elevator.

The elevator now continues to descend at slow speed until the bracket arm 202 reaches the notched portion 201 of the stop lever 200. When this occurs the lever 200 rocks farther to the left breaking the circuit to the motor, locking the elevator track section in alignment with the main track section and establishing a circuit connection to the conductor rails on the elevator. This arrangement is also similar to the construction as described in respect to the up elevator.

A spring actuated latch member 212 is pivoted at 213 to the bottom surface of the track, said latch member having a notched portion 214 adapted to engage a stop arm 215 fixed to the front end of the carrier and depending therefrom to a point adjacent the inside of the right rail section. This latch member 212 has a cam surface 216 adjacent the notched portion so that as the carrier moves into its proper position on the elevator the latch 212 will be cammed back to allow the arm to drop into place in the notched portion 214. The latch member has an offset release arm 217 adapted to be engaged by the cam member 218 carried by the supporting standard 199. The cam portion 218 is so disposed with relation to the main track section that as the elevator track sections approach and align with the main track section, these spring actuated latch members on the elevator track sections are moved to inoperative position permitting the carrier to move off of the elevator.

The means for resetting the elevator stop lever comprises an arm 219 which projects into the path of movement of the stop arm 215 as the carrier returns to the main desk. This arm 219 is suitably supported by the brackets 222 disposed below the main track.

With reference to Fig. 20 of the drawings, it will be observed that as the carrier descends and releases the stop lever 200 moving the same to the dotted line position, the arm 219 moves upwardly on the plate 221 into the path of the depending arm 215 carried by the front of the carrier. As the carrier moves along the track it engages the arm and carries the same along with it from the dotted line position to the full line position, at which point the arm 219 has moved downwardly due to the inclination of the plate 221 to the point where it clears the end of the arm 215.

The connecting link 223 between the arm 219 and the stop lever 200 having moved said stop lever to a position where the retaining latch 206 engages the shoulder 205, the down elevator control mechanism has now been returned to set position where it remains until another carrier moves thereon. The down elevator, like the up elevator, is provided with a circuit breaker 224 and a circuit maker 225. The purpose of the circuit breaker is to break the circuit to the third or conductor rails on the elevator as the carrier moves thereon while the purpose of the circuit maker is to establish circuit connections to the elevator motor.

With reference to Fig. 26 the main circuit is indicated at 166 which supplies current both to the conductor rails through the wires 226 and 227 and has the circuit breaker 224 which interrupts this just mentioned circuit in the above described manner. Current to the conductor rails 144 is also established through the circuit wire 228 which leads to a contact member 229 located on the stop lever extension 204. This contact member is designed to engage a contact member 230 on the insulating segment 231 carried by the standard 199. A conductor 232 leads from the contact 230 to one of the third rails 144 where the current passes through the carrier motor to the other third rail 144 and then through the conductor 227 back to the main circuit.

The segment 231 carries a low speed contact 233 to which is connected the circuit wire 234 extending to the low speed terminal on the elevator motor 235. The circuit to the intermediate or low speed contact is made similarly to the low speed contact as described in conjunction with the up elevator, that is, when the stop lever 200 is in its intermediate position a low speed circuit is established to the motor.

The insulating segment 231 carries a third or high speed contact 236 to which the circuit wire 237 is connected. This circuit wire 237 connects the high speed terminal 238 of the motor. Since the elevator track sections move it is not feasible to connect the terminal wires directly to them. Consequently, certain contact bars or strips 239, 240, 241, 242 must be provided adjacent the elevator chains and against which the contact portions 243, 244, 245, 246 press.

Under the conditions circuit connections are made to these contact strips and a sliding contact is established between the strips and the circuit makers and breakers in the elevator rail sections. The use of a similar arrangement is contemplated in both the up and down elevators.

*Switches*

Referring particularly to Figs. 29 to 32 of the drawings, I preferably contemplate the use of an automatic switch arrangement which is controlled by contact members 247a carried adjacent the tracks, the circuit to these contact members being made by contact members 277, 278 carried on the carrier and adjustable at the central station to close certain circuits including the contact members on the track and thereby operate certain preselected switches. Each of the switches comprises a straight rail section 247 and a curved rail section 248. These sections have depending guide brackets 249, 250 which are slotted at 251 to receive guide pins 252 carried by the track supporting standards 253 projecting upwardly from the supporting surface below the rails. Each of the guide brackets 250 is formed with a horizontally disposed slot 254 adapted to receive projecting pins 255 carried by the ends of the switch rail actuating levers 256 fixed on the actuating shaft 257 journalled in supporting brackets 258.

Intermediate the two actuating levers 256 is a latch lever 259 also secured to the shaft 257. Latch members 260 are pivotally secured to the ends of the latch lever at 261 and having their angularly disposed tails 262 disposed in the path of arms 264 on an actuating arm 263 which is freely journalled on the shaft 257. The upper extremity of the lever 263 has a forked extension 265 adapted to receive therebetween the pin 266 which projects from the latch lever 259.

The other extremity of the lever 263 carries a roller 267 which operates between parallel spaced arms 268 projecting upwardly from the armature 269. A pair of solenoid magnets 270, 271 are disposed for operating the armature, each of the magnets having an upstanding hook member 272 designed to engage one of the latch members 260.

The switch is operated as follows. Referring to Fig. 32 of the drawings, when magnet 271 is energized armature 269 will be moved to the right which rocks the actuating arm 263 in counter-clockwise direction causing the same to engage the tail 262 of the right hand latch 260. The latch is thereby rocked out of engagement with its hook 272 and thus unlocking the shaft 257. The lever 263 as it is rocked in the above described manner causes the right hand forked extension 265 to engage the pin 266 which rocks the latch lever 259 causing the shaft 257 to turn to the left. This operation rocks the levers 256 to the right, lowering the straight track section 247 and simultaneously raising the curved track section 248.

If one or the other of the track sections move into operative position, one or the other of the latches engages its respective hook member 272 so that the elevator track section will be locked in proper position until the other magnet is energized at which time the position of the parts will be reversed with the other track section locked in elevated position.

*General operation*

Assuming that the file clerk at the central desk has been instructed to obtain a certain file, say for instance number 19, the operator will depress the lever 116 projecting from the front of the selector mechanism casing 87 and by manipulation of the setting flanges 96 of the preselector disk 95 will set up the file number desired as indicated in Fig. 7 of the drawings. Since the file number desired contains only two digits, the levers 100 on the front of the selector mechanism case will be manipulated so as to shift the unit latch actuating arm out of the path of its pin projection 98 and also to shift the hundreds latch actuating arm out of the path of its pin projection 98, thus leaving only the tens actuating arm in the path of the pin 98 on the tens disk. The setting arm 132 would, of course, be shifted into operative position in order to permit the actuating mechanism for the selector to operate.

Then proper switch contacts are adjusted so that as the carrier moves along the track certain switch contacts 247a will be closed, energizing one or the other of the magnets 270 or 271 shown in Fig. 29 as the case may be thus directing the carrier to the proper storage compartment aisle. As the carrier proceeds, it passes on to the up elevator E, Figs. 27 and 28. The file clerk at the central desk having depressed the proper push button 189 for the floor level on which the file selected is to be found, the carrier as it rolls on to the up elevator first depresses the circuit maker 191 which closes the circuit to the magnet 181 shifting the elevator stop latch 171 to inoperative or disengaging position, as shown in dotted lines. When depression of the circuit maker 158 by the wheels of the vehicle takes place, circuit connections are established to the elevator motor causing the elevator to move upwardly.

The circuit breaker 157 is simultaneously depressed to break the electrical circuit to the elevator conductor rails. The elevator continues its upward travel until one of the arms 160a, as it is lifted by the projection 194 on the rear bumper of the carrier, establishes the circuit through the magnet 182 as controlled by its depressed push button or key at the central desk. The stop latch 171 now moves into engaging position and establishes communication to the conductor rails on the elevator causing the carrier motor to be energized to move the carrier off of the elevator.

The carrier now proceeds down its respective aisle to the file box that has been preselected and as it passes along the track the actuator arm 131 is actuated by the bracket members 51 which support the tracks intermediate the file box.

Bearing in mind that the selector disks are advanced two numbers at a time, the pin 98 on the selector disk 95b advances toward its respective latch actuating arm 89, (see Fig. 16 for general arrangement of these parts). As the disks register 0 the pin 98 rocks the arm 89 depressing the latch 64 which releases the latch bars 54, 54a of the file compartment alignment mechanism allowing these bars to be projected out against the sides of the track. The carrier continues with the bars in this position until the notches 53 register therewith which permits the bars to be projected further outwardly.

This last mentioned operation through the pinions 59 and 57 causes the latch bar release rod 61 to move the clutch shaft shifter bar 67, (see Fig. 8), thereby shifting the clutch shaft 32 to disestablish the drive relation between the motor and the rear wheels of the vehicle. Simultaneously the clutch member 44 engages the clutch sprocket 43 establishing a drive relation between the motor and the transfer chain 33. It must be here mentioned that the reverse pinion 45 has been properly positioned with respect to the chain, (see Figs. 9 and 10), so that the chain will be moved in the desired direction.

As the chain moves across the machine, the pin 33d carried thereby engages in the hook 13 of the file box transfers the file case from the compartment onto the carrier. Continued movement of the chain now causes the latch bar normalizing lugs 33c on the chain to engage the latch bar normalizing lugs 54b and thus continued movement of the chain retracts the latch bars from out of the notches 53 to their initial position, (see Fig. 12). This operation now rotates the pinions 57 and 59 in a reverse direction, retracting the latch bar release rod 61 until the pin 68 on the end of the release rod causes the latch release rod 82 to release the clutch shaft shifter bar 67 whereupon the spring 76 will immediately move the shiftable clutch shaft 32 to interrupt the driving relation between the motor 21 and the chain 23 and reestablish the driving relation between the motor and the vehicle wheels.

The vehicle will now continue along the track in the same direction until it approaches the down elevator, the actuator arm for the selector mechanism having been moved out of the path of the track supports as an incident to the release movement of the latch bar release rod 61.

As the carrier moves on to the down elevator, the circuit breaker 224 is depressed by the wheels of the carrier breaking the circuit to the elevator conductor rails. Simultaneously the circuit maker 225 is likewise depressed closing the circuit to the elevator motor causing the elevator to descend. As the elevator approaches the main track level, the projection 210 on the front bumper rocks the trip lever 209 to disengage the retaining latch 206 permitting the elevator stop lever to swing up against the bracket 202 secured to the end of the elevator track section. This shifting movement reduces the speed of the elevator, but it continues to descend until the bracket 202 reaches the notch 201 in the stop lever whereupon power is cut off of the elevator motor and circuit is established to the conductor rails on the elevator rails 144 on the down elevator.

Simultaneously with this operation the cam member 218 disengages the latch 212 from the bar 215 on the front of the carriage. The carriage now proceeds off of the elevator and on to the main track section. The bar 215, just mentioned, strikes the resetting arm 219 which resets the control mechanism for the down elevator so that it will be in position to be actuated by the next carrier as it descends. The carrier now returns to the central desk with the file box.

When it is desired to return the file to the storage compartment the same operation is carried out except that the reverse pinion 45, (see Fig. 10) is properly set by the clerk at the central desk by manipulation of the lever 49 on the front of the vehicle so that the pin 33d will move in the proper direction and also the pin and chain must be adjusted so that it is in proper position with respect to the file box hook or lugs. (See dotted lines on Fig. 9.)

Under these conditions the carrier will proceed along the track, through the switches, on to the up elevator and to the proper storage level and then on down to the selected file box compartment as controlled by the selector mechanism. The latch bars will be released by said mechanism causing the pin disposed in engagement with the file box hook to replace the file in the compartment whereupon the normalizing lugs will reset the drive mechanism so that the carrier will proceed on back to the down elevator and thus be returned on to the main track and back to the central station after returning the file to its file compartment.

Modified construction

Fig. 34 diagrammatically discloses a modified arrangement of my improved filing system in which a one way trackage arrangement is illustrated.

The file carrier is dispatched by the file clerk at the central desk A. The carrier moves in the direction of the arrows onto the up elevator E where it is elevated as before described. The carrier then passes along the branch tracks and through the switches G until the switch leading to the corridor in which the desired file is located, the switch selector mechanism carried by the vehicle and later to be described having been adjusted to throw a preselected switch upon the engagement of the adjustable contact members 277, 278 with certain of the contact members or strips 247a located adjacent the switches. The switch directs the carrier into the corridor where the file is withdrawn or returned as the case may be.

The carrier now approaches the switches G' located adjacent the end of the corridor where it engages the switch controlling contacts 247a for opening these switches to permit the carrier to pass out onto the side tracks. After the carrier has passed through any one of the switches leading from corridors, contact is made with the contact members or strips 247d adjacent the side tracks which close the switch again so that any other carrier passing from a more remote corridor on the same level may pass straight through the other switches.

When the carrier reaches the down elevator E', it causes the vehicle to be lowered as before described to the main level, whereupon the carrier will proceed back to the central desk A. The central desk may also be provided with a switch or switches G" to direct the carrier to the proper clerk. The space below the top of the desk A is provided with racks or storage space to permit the storage of the carriers when not in use.

The carriers are preferably constructed as far as possible out of any light material such as aluminum alloy in order to reduce the weight thereof as much as possible.

Switch selector mechanism

Referring now to Figs. 34 to 37, I provide guide brackets 273 which are secured to the under surface of the body of the carrier I (as clearly seen in Fig. 36). Slidably disposed in these brackets are the slide bars or rods 274 and 275, each of the bars having a spline or feather 276 to prevent axial rotation thereof within the brackets 273.

The outer ends of the bars each have secured thereto a wiper or contact blade 277, 278. The opposite ends of the bars are interposed between the bifurcated ends of the shifter arms 279, 280 and secured thereto by the pin and slot connections 281. The shifter arms are secured to the lower extremities of the vertically disposed adjustment shafts or rods 282, 283, these rods being journalled in the brackets 284 secured to the rear upturned end 2 of the carrier. Adjusting or setting extensions or handles 285, 286 are formed on the upper ends of the rods 282, 283.

The shifter arms 279 and 280 are provided with spring detents 287' which are adapted to engage corresponding indentations or notches 287 formed in the bottom of the body I in order to retain the shifter arms in any of their adjusted positions as shown in the dotted lines adjacent the contact blades 277, 278. The two blades 277, 278 are conductively connected together in order to complete the electrical circuit between any two of the contact members 274a that are in alignment with the adjusted position of the blades. The bridging of these contacts completes the circuit to the switch magnets in the manner described in connection with Figs. 29 to 32 to cause operation of the switch mechanism.

The contacts 247a are disposed adjacent the switches in relatively different spaced relations with respect to each other and to the track so that the contact blades will cause operation only of a preselected switch, depending upon the selected adjustment of the blades 277, 278 as set by the clerk at the central desk. With the form of switch as shown herein I prefer to normalize or close the switch each time after a file carrier has passed through it and for this purpose I provide a pair of switch contacts 247d just beyond each switch, the spacing of each pair of these contacts being the same.

A contact blade 288 is fixed to the carrier at 289 for bridging the last two contacts upon passage of the carrier through the switch which causes the electric circuit to be closed to the proper switch magnet and thus condition the switch so that the file carriers may be dispatched to and returned from other corridors without further manipulation of the switches leading to and from the corridors that are not being used.

The spacing arrangement of the track contacts 247d for any particular switch may be the same as the contacts for controlling that particular switch, in which event the supplementary contact blade 288 on the carrier could be dispensed with since the adjustable contacts 277 and 278 after opening a particular switch selected would engage the contacts 247d in this case after the carrier had passed through the switch and thus cause the closing or normalizing of the switch.

I claim:

1. In a file system of the class described, a storage compartment for files, a carrier device, means on said carrier device operable to extract the file from said compartment, and means for propelling the carrier to said compartment including manually settable preselector means on the carrier for effecting a stoppage of the carrier at a predetermined compartment and transfer of the propelling effort to the file extracting means at said predetermined compartment.

2. In a file system of the class described, a plurality of storage compartments for files, a carrier device, mechanism on said carrier for shifting the files onto and from the carrier, preselector means on the carrier for preselecting a desired compartment, means for propelling the carrier to and from the same under control of said preselector means, and means under control of the preselector means for stopping the carrier and for transferring the propelling effort from the carrier when said carrier reaches the selected compartment to the file shifting means.

3. In a file system of the class described, a plurality of storage compartments for files, a carrier device, a trackage system to and from the compartments, means for propelling the carrier along the trackage system, preselector mechanism on the carrier settable at a point in the trackage system remote from the storage compartments for causing stopping of the carrier at the desired compartment, means under control of said preselector mechanism for effecting transfer of the contents of the compartment relative to the carrier, and stop means operable by said preselector mechanism for holding the carrier stationary while the transfer of the contents is effected.

4. In a file system of the class described, a central distributing station, a plurality of storage compartments for files remotely located from said station, a carrier device, a trackage system between said station and the compartments, means for propelling the carrier along the trackage system, preselector means on the carrier settable at the central distributing station for automatically stopping the carrier at a preselected compartment and shifting the contents thereof relative to the carrier for delivery to the central station and automatically returning the carrier to the said station.

5. In an article handling system of the class described, a trackage system having a plurality of delivery stations therealong and a central distributing station therefor, a carrier device operable on said trackage system, stop means on said carrier for stopping and holding the same at any one of the delivery stations, a preselector unit on said carrier adapted to be set at the central station for subsequently operating the stop means when a selected delivery station is reached, and article shifting means on the carrier adapted to be set into operation incident to operation of the stop means aforesaid.

6. A file carrier for file collection and distributing systems of the class described, comprising a wheeled body, traction drive means therefor, file transfer means on the body, a power device for driving both said means, and means automatically operable by said transfer means for establishing a driving relation between said power device and said traction drive means.

7. A file carrier for file collection and distributing systems of the class described, comprising a wheeled body, traction drive means therefor, file transfer means on the body, a power device for driving both said means, means subsequently operable by said transfer means for establishing a driving relation between said power device and said traction drive means, and preselector means on the wheeled body settable at a remote point for subsequently interrupting the driving relation between said power device and said traction drive means at a point in the travel of the wheeled body.

8. A file carrier for file collection and distributing systems of the class described comprising a wheeled body, traction drive means therefor, file transfer means on the body, a power device for driving both said means, means operable by said transfer means for establishing a driving relation between said power device and said traction drive means, and settable preselector means on the wheeled body for subsequently interrupting the driving relation between said power device and said traction drive means at a predetermined time and simultaneously establishing the driving relation between said power device and said transfer means.

9. A file carrier for file collection and distributing systems of the class described, comprising a wheeled body, traction drive means therefor, stop means therefor, file transfer means on said body, a power device for driving said traction drive means and said transfer means, shiftable means operable in one direction by said transfer means for establishing a driving relation between said power device and said traction drive means shiftable in another direction to establish a driving relation between the power device and the transfer means and means for shifting the same in the last mentioned direction, and a settable preselector device on the wheeled body for subsequently controlling the operation of said shiftable means and operable to permit said shiftable means to move in the last mentioned direction to interrupt the driving relation between said traction drive means and said power device and to establish a driving relation between said transfer means and said power device, said shiftable means being simultaneously operable to cause said stop means to arrest travel of the wheeled body.

10. In a file system of the class described, a plurality of file compartments, a track leading to said compartments and having an abutment means and obstacle operating means adjacent each compartment, a wheeled carrier disposed on said track for travel to said compartments, transfer means on said carrier for withdrawing files from and returning files to said compartments and stop means adapted to cooperate with said abutment means and settable preselector means on the carrier operable by said obstacle operating means to release the stop means at a predetermined point in the travel of the carrier and to cause operation of said transfer means upon said cooperation.

11. In a file system of the class described, a plurality of file compartments, a track leading to said compartments and having an abutment means adjacent each compartment, a wheeled carrier disposed on said track for travel to said compartments, transfer means on said carrier for withdrawing files from and returning files to said compartments and stop means adapted to cooperate with said abutment means and automatically operable to cause operation of said transfer means upon said cooperation, said transfer means being constructed and arranged to subsequently engage said stop means to withdraw the same from cooperation with said abutment means.

12. In a file system of the class described, a plurality of file compartments, a track leading to said compartments and having an abutment means adjacent each compartment, a wheeled carrier disposed on said track for travel to said compartments, transfer means on said carrier for withdrawing files from and returning files to said compartments and stop means adapted to cooperate with said abutment means and automatically operable to cause operation of said transfer means upon said cooperation, said transfer means being constructed and arranged to subsequently engage said stop means to withdraw the same from cooperation with said abutment means and means operable by said transfer device to cause subsequent travel of said carrier along said track.

13. In a file system of the class described, a track, compartments adjacent both sides of the track, obstacle operating abutment means adjacent the compartments, a wheeled carrier mounted for travel on the track to said compartments and past said abutment means, transfer means on said carrier for transferring files from said carrier to said compartments and from said compartments to said carrier, manually settable means on said carrier for controlling the direction of movement of said transfer device to control the return to or delivery of files from the compartments on a preselected side of the tracks, and preselector means on the carrier and operable by said obstacle operating abutment means for controlling the point of delivery along the track and controlling the operation of said transfer device at said point.

14. In a file system of the class described, a track, compartments adjacent both sides of the track, obstacle operating abutments located along one side of the track adjacent each of the compartments, a wheeled carrier mounted for travel on the track to said compartments, transfer means on said carrier for transferring files from said compartments to said carrier, manually settable means on said carrier for controlling the direction of movement of said transfer device to control the return to or delivery of files from the compartments on a preselected side of the tracks, settable preselector means on the carrier operable by contact with said obstacle operating abutments for controlling the point of delivery of files to the compartment along the track, and stop means under control of said preselector means for stopping the travel of the carrier at the preselected point and simultaneously causing file transfer between the carrier and a preselected compartment.

15. In a file system of the class described, the combination with a plurality of rows of article storage compartments arranged in spaced relation to form an aisle therebetween, a main track, a branch track extending therefrom into said aisle and leading to said compartments and having an obstacle operating abutment adjacent each compartment, article storage containers disposed in said compartments of a carrier vehicle movable along said tracks, said vehicle comprising a wheeled body having a supporting surface for supporting and conveying an article container to and from a designated point, transfer means movable across said supporting surface to shift said containers to or from said compartments, means for moving said transfer device in one direction, reverse means for moving said transfer means in the opposite direction, and a manually settable preselector device on the carrier adapted to be set at said designated point and operable by said obstacle operating abutments for controlling the positive stopping of said carrier and simultaneous operation of said transfer device.

16. In a wheeled carrier of the class described, a supporting body having wheeled supports for travel on a supporting surface, transfer means thereon for shifting articles onto and off of said supporting body, stop means mounted on the body for engagement with the supporting surface on which the carrier travels, means for moving said stop means into engagement with said surface, power means for driving said wheeled support and for driving said transfer means, a preselector device on said body having actuating means therefor, abutment members located along the surface on which the vehicle travels for operating said actuating means, said preselector device including settable means shiftable by said actuating means to release said stop means and transfer the power from said wheeled support to said transfer means at a predetermined location along the surface on which the carrier is adapted to travel.

17. In a wheeled carrier of the class described, a supporting body having wheeled supports for travel on a supporting surface, transfer means thereon for shifting articles onto and off of said supporting body, stop means mounted on the body for engagement with the supporting surface on which the carrier travels, means for moving said stop means into engagement with said surface, power means for driving said wheeled support and for driving said transfer means, a preselector device on said body having actuating means therefor, abutment members located along the surface on which the vehicle travels for operating said actuating means, said preselector device including settable means shiftable by said actuating means to release said stop means and transfer the power from said wheeled support to said transfer means at a predetermined location along the surface on which the carrier is adapted to travel, and means operable by said transfer means for returning said stop means to inoperative position and transferring the power from said transfer means to said wheeled support.

18. In a file system of the class described, a track system including actuating abutments located along said track, file compartments located on either side of the track, stop means arranged adjacent each abutment, a filing device movable along said track past said abutments and compartments, holding means on the filing device arranged for cooperative engagement with said stop means for arresting movement of said device when the same is in alined receiving position with respect to any of said compartments, and settable preselector mechanism on said filing device for holding said holding means in inoperative position and for releasing said holding means at any preselected point along said tracks operable by said actuating abutments.

19. In a file system of the class described, a trackage system, file compartments located on either side of the tracks, a filing device movable along said track past said compartments, latch means on said filing device for arresting movement thereof when said device is in receiving position with respect to any of said compartments, settable selector mechanism on said carrier for releasing said latch means at any preselected point along said tracks, said selector mechanism comprising a shaft, a selector disk rotatably mounted thereon having a projection extending therefrom, an arm disposed in the path of said projection, means for releasing said latch means upon movement of said arm by said projection, an actuator for rotating said disk, and means on said track for actuating said actuator.

20. In a file system of the class described, a trackage system, file compartments located on either side of the tracks, a filing device movable along said track past said compartments, latch means on said filing device for arresting movement thereof when said device is in receiving position with respect to any of said compartments, settable selector mechanism on said carrier for releasing said latch means at any preselected point along said tracks, said selector mechanism comprising a shaft, a selector disk rotatably mounted thereon having a projection extending therefrom, an arm disposed in the path of said projection, means for releasing said latch means upon movement of said arm by said projection, an actuator for rotating said disk, means on said track for actuating said actuator, and means for moving said actuator to inoperative position operable by said latch means upon movement thereof to operative position.

21. In a file system of the class described, a track, a carrier operable thereon, a supporting body on said said carrier, a transversely disposed transfer belt movably disposed on said carrier, drive wheels for said carrier, a motor, shiftable drive means for driving the wheels from said motor when in one position and for operating said transfer belt when shifted to another position, spring means to shift said drive means to the last named position, latch means for retaining said shiftable drive means in the first position, and a preselector device for releasing said latch means at a predetermined point along said track.

22. In a file system of the class described, a track, a carrier operable thereon, a supporting body on said carrier, a transversely disposed transfer belt movably disposed on said carrier, drive wheels for said carrier, a motor, shiftable drive means for driving the wheels from said motor when in one position and for operating said transfer belt when shifted to another position, spring means to shift said drive means to the last named position, latch means for retaining said shiftable drive means in the first position, a preselector device for releasing said latch means at a predetermined point along said track, and carriage stop means on said body shiftable for engagement with said track and operable by the aforementioned spring means under the control of said preselector device.

23. In a file system of the class described, a track, a carrier operable thereon, a supporting body on said carrier, a transversely disposed transfer belt movably disposed on said carrier, drive wheels for said carrier, a motor, shiftable drive means for driving the wheels from said motor when in one position and for operating said transfer belt when shifted to another position, a spring means to shift said drive means to the last named position, latch means for retaining said shiftable drive means in the first position, a preselector device for releasing said latch means at a predetermined point along said track, carriage stop means on said body shiftable for engagement with said track and operable by the aforementioned spring means under the control of said preselector device, and means on said transfer belt for moving said stop device to inoperative position.

24. In a file system of the class described, a central distributing and collecting station, a plurality of file compartments located at different levels, a track on each level leading past said file compartments, an elevator located and arranged at one extremity of said track and having a plurality of track sections constructed and arranged to simultaneously align with said tracks on the different levels, a track extending between the central station and the elevator, a power operated carrier mounted for travel along said tracks, power means for operating said elevator, a control device on said elevator arranged to be actuated by the carrier to set the elevator in motion when the carrier moves thereonto, level selector mechanism actuated by the carrier for determining a preselected level and discontinuing the operation of the elevator at the preselected level including means for causing the power-actuated carrier to move off of the elevator at said level, and settable automatic means on the carrier for dispatching the carrier to a preselected compartment, stopping the carrier at said compartment, extracting a file therefrom, and subsequently causing continued return travel of the carrier to the central station.

25. In a file system of the class described, article storage compartments arranged at different levels, a branch track on each level extending past said compartments, a main track, a carrier movable along said tracks, an elevator operating between the main tracks and the branch tracks, said elevator being normally stationary and constructed and arranged to be set into operation by the carrier upon movement thereof upon the elevator, preselector mechanism for determining the selected compartment on a selected level including parts on the carrier for causing discontinuance of the elevator travel and simultaneous movement of the carrier from the elevator onto the selected branch track and subsequent discontinuance of the travel of the carrier when the selected compartment is reached.

26. In a file system of the class described, article storage compartments arranged at different levels, a branch track on each level extending past said compartments, a main track, a carrier movable along said tracks, an elevator operating between the main tracks and the branch tracks, said elevator being normally stationary and constructed and arranged to be set into operation by the carrier upon movement thereof upon the elevator, preselector mechanism for determining the selected compartment on a selected level including parts on the carrier for causing discontinuance of the elevator travel and simultaneous movement of the carrier from the elevator onto the selected branch track and subsequent discontinuance of the travel of the carrier when the selected compartment is reached, said last named parts including means for automatically moving an article from the carrier to the compartment when the travel of the carrier is discontinued upon reaching the compartment.

27. In a file system of the class described, article storage compartments arranged at different levels, a branch track on each level extending past said compartments, a main track, a carrier movable along said tracks, an elevator operating between the main tracks and the branch tracks, said elevator being normally stationary and constructed and arranged to be set into operation by the carrier upon movement thereof upon the elevator, preselector mechanism for determining the selected compartment on a selected level including parts on the carrier for causing discontinuance of the elevator travel and simultaneous movement of the carrier from the elevator onto the selected branch track and subsequent discontinuance of the travel of the carrier when the selected compartment is reached, said last named parts including means for automatically moving an article from the carrier to the compartment when the travel of the carrier is discontinued upon reaching the compartment, and means operable by said article moving means for automatically causing subsequent travel of the carrier along said track.

28. In a file system of the class described, article storage compartments arranged at different levels, a branch track on each level extending past said compartments, a main track, a carrier movable along said tracks, an elevator operating between the main tracks and the branch tracks, said elevator being normally stationary and constructed and arranged to be set into operation by the carrier upon movement thereof upon the elevator, preselector mechanism for determining the selected compartment on a selected level including parts on the carrier for causing discontinuance of the elevator travel and simultaneous movement of the carrier from the elevator onto the selected branch track and subsequent discontinuance of the travel of the carrier when the selected compartment is reached, said last named parts including means for automatically moving an article from the carrier to the compartment when the travel of the carrier is discontinued upon reaching the compartment, means operable by said article moving means for automatically causing subsequent travel of the carrier along said track, and a second elevator arranged between said branch track and said main track constructed and arranged to receive the carrier from any of the branch tracks and automatically convey said carrier to said main track.

29. In a file system of the class described, article storage compartments arranged at different levels, a branch track on each level extending past said compartments, a main track, a carrier movable along said tracks, an elevator operating between the main tracks and the branch tracks, said elevator being normally stationary and constructed and arranged to be set into operation by the carrier upon movement thereof upon the elevator, preselector mechanism for determining the selected compartment on a selected level including parts on the carrier for causing discontinuance of the elevator travel and simultaneous movement of the carrier from the elevator onto the selected branch track and subsequent discontinuance of the travel of the carrier when the selected compartment is reached, said last named parts including means for automatically moving an article from the carrier to the compartment when the travel of the carrier is discontinued upon reaching the compartment, means operable by said article moving means for automatically causing subsequent travel of the carrier along said track, a second elevator arranged between said branch track and said main track constructed and arranged to receive the carrier from any of the branch tracks and automatically convey said carrier to said main track, said second elevator having means for discontinuing the travel of the carrier as it moves thereon and constructed and arranged to automatically cause operation of said elevator, and means for causing discontinuance of the travel of the elevator when said main track is reached and to cause simultaneous travel of the carrier off of said second elevator and onto said main track.

30. In a file system of the class described, article storage compartments arranged in rows at different levels and disposed in opposing spaced relation to provide passageways therebetween, a one-way branch track extending along said passageways between the rows of compartments, an up elevator disposed at one terminus of said branch track, a down elevator located at the other terminus of said branch track, a central file distributing and collecting station, a main track extending between said elevators and said station, a file carrier movable along said tracks, means on said carrier for causing automatic operation of said elevators when said carrier moves thereon, means on said elevators for discontinuing the travel of the carrier during the travel of the elevators, and preselector means for stopping said up elevator at a preselected level including a part on the carrier for causing stoppage of the elevator at said preselected level and subsequent travel of the carrier off of said up elevator onto said branch tracks.

31. In a file system of the class described, article storage compartments arranged in rows at different levels and disposed in opposing spaced relation to provide passageways therebetween, a one-way branch track extending along said passageways between the rows of compartments, an up elevator disposed at one terminus of said branch track, a down elevator located at the other terminus of said branch track, a central file distributing and collection station, a main track extending between the said elevators and said station, a file carrier movable along said tracks, means on said carrier for causing automatic operation of said elevators when said carrier moves thereon, means on said elevators for discontinuing the travel of the carrier during the travel of the elevators, preselector means for stopping said up elevator at a selected level including a part on the carrier for causing stoppage of the elevator at said selected level and subsequent travel of the carrier off of said up elevator onto said branch tracks, and lock means for positively preventing relative movement between the carrier and elevator when the elevator is in operation with the carrier thereon.

32. In a file system of the class described, a central distributing and collecting station, a plurality of storage compartments remotely disposed with respect to said station, a trackage system including tracks between said station and said compartments having an operating abutment member adjacent each compartment, a carrier operable along said tracks between the aforesaid station and compartments, said carrier comprising a self-propelled wheeled body, preselector mechanism on the carrier settable at the central station and constructed and arranged to be actuated by said operating abutments for dispatching the carrier to a preselected position in front of any one of said compartments, automatically stopping the carrier at said point, extracting a file from said compartment and automatically causing return travel of said carrier along the track to said central station.

33. In a file system of the class described, a plurality of rows of storage compartments arranged on a plurality of different levels and having corridors between said compartments, branch tracks extending into said corridors, a main track, switches connecting said main track with said branch tracks, a carrier operable on said tracks, and preselector mechanism on said carrier for controlling the movement of said carrier along said tracks, for operating a preselected switch to direct said carrier onto a preselected branch track and into a preselected corridor to cause transfer of an article between the carrier and the preselected compartment, and to cause return of the carrier onto said main track.

34. In a file system of the class described, a main track, a plurality of branch tracks, storage compartments located along said branch tracks, switches connecting said main track with said branch tracks, a carrier operable along said tracks, and manually settable preselector means on the carrier for dispatching said carrier from a point on said main track to a preselected point on one of said branch tracks, extracting an article from one of said compartments and returning the carrier and the said extracted article to the main track, including manually settable switch control means on the carrier for selectively controlling the operation of said switches as the carrier proceeds along the tracks.

35. In a file system of the class described, a main track, a plurality of branch tracks located at different elevations or levels, switches between said tracks, an elevator interposed between said main and branch tracks, a carrier operable along said tracks, carrier operated elevator control means for causing operation of said elevator only when the carrier moves thereonto, carrier controlled switches between said main and said branch tracks, and control means on the carrier for automatically controlling the movement of the carrier to a preselected compartment on a preselected level and the automatic extraction of an article from said compartment, the return of an article to said compartment, the operation of a preselected switch to direct the carrier onto a preselected branch track, and the return of the carrier from said compartment to said main track.

36. In a file system of the class described, a plurality of file receiving storage compartments arranged in rows at different elevations, each compartment including a file box supporting member inclining downwardly and rearwardly from its receiving end, a file box for said compartment having roller means for supporting the box on the box-supporting member of the compartment aforesaid, a track extending past the receiving end of said compartment, a wheeled carrier operable along said track and having a file box supporting member disposed at substantially the same elevation as the receiving end of the file box supporting member, transfer means on the carrier for shifting the file box from the carrier supporting member onto the compartment supporting member, reverse means for said transfer means for controlling direction of movement thereof to move a file from the inclined compartment supporting means onto the supporting means on the carrier, and settable preselector means on the carrier for controlling the movement of the carrier to and from said position in front of said compartment and the extraction of the file box from the compartment, the return of the file box to said compartment, said inclined supporting means for the file box constituting means to assist in returning the file box to said compartments and to retain the file box therein after its return.

37. In a file system of the class described, a plurality of file receiving compartments arranged in side by side relation, a track disposed in front of said compartments, supports for said track, abutment members disposed along the track, one at each compartment, a carrier mounted for travel along said track and having file transfer means thereon, settable preselector means on the carrier for controlling the movement thereof to a selected compartment and including an actuator member therefor constructed and arranged to be actuated by the abutment members aforesaid, an indicia carrying member for the selector means for setting up the number or indicia of the file desired and movable step by step by the actuating member back to a zero position, and carrier stop means for causing stoppage of travel of the carrier when the indicia carrying member is shifted to said zero position and simultaneously causing actuation of said transfer means.

38. In a file system of the class described, a plurality of file receiving compartments arranged in side by side relation, a track disposed in front of said compartments, supports for said track, abutment members disposed along the track, one at each compartment, a carrier mounted for travel along said track and having file transfer means thereon, settable preselector means on the carrier for controlling the movement thereof to a selected compartment and including an actuator member therefor constructed and arranged to be actuated by the abutment members aforesaid, an indicia carrying member for the selector means for setting up the number or indicia of the file desired and movable step by step by the actuating member back to a zero position, carrier stop means for causing stoppage of travel of the carrier when the indicia carrying member is shifted to said zero position and for simultaneously causing actuation of said transfer means, and resettable means for simultaneously moving said actuating member out of the path of said abutment members upon actuation of said transfer means.

39. In a file system of the class described, a plurality of file receiving compartments arranged in side by side relation, a track disposed in front of said compartments, supports for said track, abutment members disposed along the track, one at each compartment, a carrier mounted for travel along said track and having file transfer means thereon, settable preselector means on the carrier for controlling the movement thereof to a selected compartment and including an actuator member therefor constructed and arranged to be actuated by the abutment members aforesaid, an indicia carrying member for the selector means for setting up the number or indicia of the file desired and movable step by step by the actuating member back to a zero position, carrier stop means for causing stoppage of travel of the carrier when the indicia carrying member is in said zero position and simultaneously causing actuation of said transfer means, resettable means for simultaneously moving said actuating member out of the path of said abutment members upon actuation of said transfer means, and means operable by said transfer means for subsequently causing continued travel of said carrier along said track from said selector compartments.

40. In a file system of the class described, a plurality of file receiving compartments arranged in side by side relation, a track disposed in front of said compartments, supports for said track, abutment members disposed along the track, one at each compartment, a carrier mounted for travel along said track and having file transfer means thereon, settable preselector means on the carrier for controlling the movement thereof to a selected compartment and including an actuator member therefor constructed and arranged to be actuated by the abutment members aforesaid, on indicia carrying member for the selector means for setting up the number or indicia of the file desired and movable by the actuating member back to a zero position, carrier stop means to stop the travel of the carrier when the indicia carrying member is shifted to said zero position and for simultaneously causing actuation of said transfer means, and release means for said stop means operable by said transfer means upon predetermined movement of said transfer means for releasing said stop means and simultaneously causing further travel of the carrier along said tracks.

41. In a file system of the class described, a plurality of file receiving compartments arranged in side by side relation, a track disposed in front of said compartments, supports for said track, abutment members disposed along the track, one at each compartment, a carrier mounted for travel along said track and having file transfer means thereon, settable preselector means on the carrier for controlling the movement thereof to a selected compartment and including an actuator member therefor constructed and arranged to be actuated by the abutment members aforesaid, an indicia carrying member for the selector means for setting up the number or indicia of the file desired and movable step by step by the actuating member back to a zero position, carrier stop means for causing stoppage of travel of the carrier when the indicia carrying member is shifted to said zero position and for simultaneously causing actuation of said transfer means, and settable control means for said transfer means for selectively determining the direction of movement of said transfer means.

42. In a file system of the class described, a trackage system comprising parallel side rails having abutments located in spaced relation along each of said rails in pairs, an article carrier mounted to travel along said rails having shiftable locking bars arranged to be simultaneously shifted into locking engagement with any pair of said abutments, means on the carrier for urging the bars into locking engagement with the abutments, common holding means for holding the bars in inoperative position with respect to the rails and abutments during travel of the carrier, preselector means on the carrier settable at a point in the trackage system remote from said abutments for subsequently operating said latch holding means to release the bars simultaneously at a predetermined point in the travel of the carrier for engagement with a predetermined pair of abutments.

43. In a file system of the class described, a trackage system comprising parallel side rails having abutments located in pairs in spaced relation along each of said rails, an article carrier mounted to travel along said rails having a pair of cooperating simultaneously shiftable locking bars arranged to be shifted into locking engagement with any pair of abutments, means on the carrier for simultaneously shifting the bars when released into locking engagement with the abutments, common latch means for holding both of the bars in inoperative position with respect to the rails and abutments, preselector means on the carrier settable at a point in the trackage system remote from said abutments for subsequently operating said latch means to release the bars at a predetermined point in the travel of the carrier for engagement with a predetermined pair of abutments, a storage compartment located adjacent each pair of said abutments, and transfer means on the carrier for transferring articles between the carrier and the compartments arranged to be held in inoperative position by said latch means and simultaneously rendered operable with said locking bars under the control of said latch means.

44. In a file system of the class described a track comprising parallel side rails each having stop abutments formed therein in pairs at opposite predetermined points, storage compartments located adjacent said track, one compartment being arranged at each pair of stop abutments, a wheeled carrier mounted for travel along said rails having a pair of oppositely shiftable locking bars movable into locking engagement with any pair of abutments, a conveyor belt mounted on the carrier for moving articles conveyed thereby to and from the compartment and for subsequently disengaging said locking bars from said abutment, common power means for moving said wheeled carrier along the track and operating said conveyor belt and the locking bars, a shiftable driving clutch member movable in one direction to establish a driving relation between the common power means and the wheels of the carrier and shiftable in another direction to establish a driving relation between the power means and said conveyor belt, and means operable by said latch means upon movement thereof to shift said conveyor means from engaging to disengaging position for causing said shiftable driving clutch member to re-establish driving relation between the common power means and the wheels of the carrier.

45. In a file collection and delivery system of the class described, a series of file compartments representing stations remotely disposed relative to a central station, a carrier system operable between said central and remote stations comprising a carrier member, a preselector device adapted to be intermittently operated in its movement between the said stations, said device being settable at the central station for a number of movements predetermined for the selected remote station, and obstacle operating means between said stations for imparting the increments of movement to said device incident to its travel to the selected station, whereby the carrier is stopped at the selected station when said increments of movement have been imparted to the preselector device.

JAMES W. COOMBS.